US008666837B2

(12) United States Patent
Urbanski et al.

(10) Patent No.: US 8,666,837 B2
(45) Date of Patent: Mar. 4, 2014

(54) METHOD AND MEDIUM FOR DYNAMIC PROPERTY RE-PRICING USING PARTIAL BROKER SERVICES

(76) Inventors: Artur M. Urbanski, Burlingame, CA (US); Santosh V. Philip, Berkeley, CA (US); Rosalyn K. L. Lum, Burlingame, CA (US)

( * ) Notice: Subject to any disclaimer, the term of this patent is extended or adjusted under 35 U.S.C. 154(b) by 167 days.

(21) Appl. No.: 13/479,236

(22) Filed: May 23, 2012

(65) Prior Publication Data

US 2013/0317939 A1    Nov. 28, 2013

(51) Int. Cl.
*G06Q 30/00* (2012.01)
(52) U.S. Cl.
USPC ........................................... 705/26.1
(58) Field of Classification Search
USPC ........ 705/26.1, 26.8, 26.61, 26.41, 27.1, 27.2
See application file for complete search history.

(56) References Cited

U.S. PATENT DOCUMENTS

| | | | |
|---|---|---|---|
| 5,924,082 A | 7/1999 | Silverman et al. | |
| 6,321,202 B1 | 11/2001 | Raveis, Jr. | |
| 7,389,242 B2 | 6/2008 | Frost | |
| 7,818,219 B2 | 10/2010 | Klivington et al. | |
| 7,987,113 B2 * | 7/2011 | Blumberg et al. | 705/14.15 |
| 8,055,539 B1 * | 11/2011 | Kline | 705/14.49 |
| 2005/0149419 A1 * | 7/2005 | Blumberg et al. | 705/35 |
| 2005/0192930 A1 | 9/2005 | Hightower et al. | |
| 2008/0319890 A1 * | 12/2008 | Urbanski et al. | 705/37 |
| 2009/0119193 A1 | 5/2009 | Selleck | |
| 2009/0276362 A1 | 11/2009 | Guerra | |
| 2011/0066561 A1 | 3/2011 | Lazarre et al. | |

OTHER PUBLICATIONS

Donald Jud, "The Impact of Information Technology on Real Estate Licensee Income" Journal of Real Estate Practice and Education, vol. 5, Issue 1, pp. 1-16, 2002.*

* cited by examiner

*Primary Examiner* — Matthew Zimmerman
(74) *Attorney, Agent, or Firm* — Louis Ventre, Jr.

(57) ABSTRACT

A computer program product having code that when executed implements steps in a method for displaying to the user a recalculated sales price of realty. The recalculated sales price reflects user-selected brokerage services and not a fixed-commission percentage, typical with the sale of realty. Steps include establishing a database of itemized broker services; accessing a sales price of the realty; providing user access to the database; recording user-selected broker services; producing a recalculated sales price of the real estate property factoring the user-selected broker services into the sales price; and then displaying to the user the recalculated sales price. A system using the computer program product gets smarter with use because the method may include steps of automatically recalculating average factors used to produce a recalculated sales price of the real estate property.

8 Claims, 20 Drawing Sheets

METHOD AND MEDIUM FOR DYNAMIC PROPERTY RE-PRICING USING PARTIAL BROKER SERVICES

TECHNICAL FIELD

In the field of data processing involving financial, business practice, management, and cost/price determination, wherein an electrical apparatus and its corresponding methods perform data processing operations in which there is a significant change in the data through performing calculation operations wherein the apparatus or method is uniquely designed for or utilized in the practice, administration, or management of a real estate enterprise.

BACKGROUND ART

Real estate broker services are today paid on the basis of a fixed percentage of the sales price of the realty. The panoply of broker services are packaged together and covered by the fixed percentage, regardless of whether or not the purchaser wants all of those services or wishes to pay for only those he wants. This is partially attributable to the regulatory environment, which has conditioned people to treat real estate knowledge and service to the purchaser, as an indivisible whole. As a result, people are often required to pay for full-scope broker services even if they do not want some services, even if they do not obtain some services, and even when they perform some of these services for themselves. The broker is paid the fixed percentage of real estate property price. Today, no broker fees are actually paid based on an independent pricing of the value of broker services actually delivered to the purchaser. Also, there is no mechanism or algorithm to capture relationship between property values and values of broker services used for buy/sell transactions involving real estate.

SUMMARY OF INVENTION

A computer program product that implements steps in a method. The method results in displaying to the user a recalculated sales price of realty, where the recalculated sales price reflects user-selected brokerage services and not a fixed-commission percentage, typical with the sale of realty.

The steps include establishing a database of itemized broker services from a broker, preferably many brokers. The database is stored on computer usable memory. Each itemized broker service is linked to a specific fixed-price.

In the method, a computer or system implementing the steps, accesses a sales price of the realty, which is typically available from commercial listing services. The method includes providing user access to the database; recording user-selected broker services; producing a recalculated sales price of the real estate property factoring the user-selected broker services into the sales price; and then displaying to the user the recalculated sales price.

The system gets smarter with use because the method may include steps of automatically recalculating average factors used to produce a recalculated sales price of the real estate property. The system also enables the broker to change the specific fixed-price charged by the broker and to change the plurality of itemized broker services.

Preferably, the method includes storing the user-selected broker services in a computer memory device and placing the recalculated sales price in a shopping cart, preferably where each property has a separate shopping cart. Then, the method includes a step of enabling the user to submit an offer for purchase of the real estate property using the shopping cart.

The database may hold data on other non-broker priced services related to realty, such as engineering inspections or another itemized service and its associated price from non-brokers.

Technical Problem

Residential real estate transactions in the United States (US) primarily use the commission method. Buyers and sellers pay commissions for the services provided to them by real estate agents that are embedded in the selling price. The specific services provided by real estate agents are not itemized and therefore difficult to price.

Numerous efforts were undertaken to introduce fee-based models that would break down specific services to buyers and sellers of real estate, but they have not succeeded in challenging a commission-based model. Fee-based models itemize and price specific services performed by agents during real estate transactions. Fees are paid as you go (at completion of service) and they are not embedded in the price of real estate being purchased. Presently, there are no methods for pricing fee-based services.

In commission-based approach buyers seemingly obtain a free service as they do not pay initially for service provided. However, the costs of services they receive are embedded in the real estate price. So, at the end of a transaction, both seller and buyers are charged for agent commissions. The perception of free service to buyers and the fact that sellers sign listing agreement that includes commissions for both, listing and selling agents have helped the commission-based method to firmly entrench itself as a way to buy residential real estate. Additionally, as the commission-based method does not itemize services provided to buyers and sellers there is lack of common knowledge what these services are, should be and how they should be priced.

Another disadvantage of the commission-based method to purchase real estate is that it does not allow buyers and sellers to buy partial real estate transaction knowledge from agents, nor allow hiring different agents for different parts of the transaction. Buyers and sellers are forced to work with a single agent, while having multiple agents could be more beneficial. At the same time, the commission-based method does not permit the buyer or seller to pay based on the specific agents expertise, that is, agents are always rewarded with a fixed-percentage commission that is independent of any measure of the agents specific knowledge.

Solution to Problem

A computerized system and method applies rules that enable a purchaser to select individualized real estate brokerage services and then re-calculate real property sales prices based upon selected services. It is a system that automates pricing real estate broker services and it may include five computer modules that implement system. It is a system that allows individual real estate brokers to re-price any MLS listing and automatically select and price agent services to be provided to buyers by brokers. The system can get smarter with use and editing by participating brokers.

Advantageous Effects of Invention

The system and method allows a user to easily eliminate embedded broker commissions from the price of real estate on the market. The system and method identifies separable services provided by a real estate agent during the purchase of a property and establishes prices for those separable services.

The system creates an interdependence between the price of real estate, the price for a total package real estate agents services, and the price for partial agent services. It empowers buyers and sellers with an ability to acquire partial real estate transaction expertise (real estate knowledge), as needed, and to pay for partial service components. The system allows different types of payment methods, as suited to clients.

DESCRIPTION OF EMBODIMENTS

Figure 1:
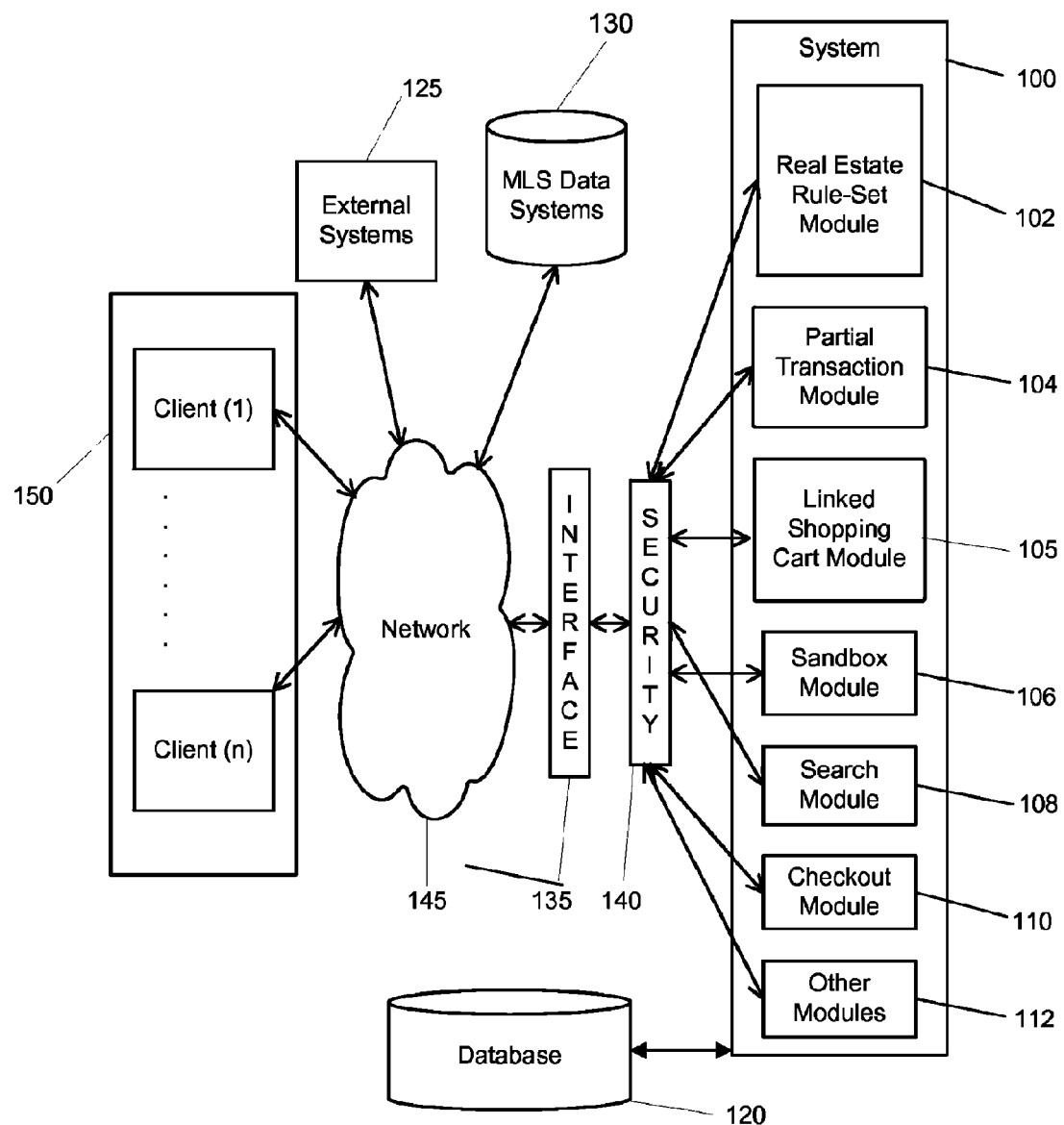
FIG. 1 is an illustration of a system-level example, in accordance with various embodiments.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order that results providing an altered sales price of a real estate property by enabling a user to select parceled broker services. Real estate property is also referred to herein as property.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram or figure discussed herein may depict components as logically separate, such depiction is merely for illustrative purposes. It can be apparent to those skilled in the art that the components portrayed can be combined or divided into separate software, firmware, hardware and mobile components. For example, one or more of the embodiments described herein can be implemented in a network accessible device or appliance. Furthermore, it will also be apparent to those skilled in the art that such components, regardless of how they are combined or divided, can execute on the same computing device or can be distributed among different computing devices connected by one or more networks or other suitable communication means.

In accordance with various embodiments, there are provided systems and methods for enabling the quantification of knowledge for real estate transactions. The quantification of knowledge can be implemented as an interactive web site application deployed on a server that manages a multitude of clients connected to a network, such as the Internet. By way of non-limiting example, the server can be a web server or an application server. The server can accept Hyper Text Transfer Protocol (HTTP) requests from various clients and can provide web pages that contain HTML information.

In one embodiment, there are provided systems and methods for enabling quantification and trading of partial real estate transaction expertise (components of real estate transactions). The system would allow buyers and sellers to acquire partial real estate transaction expertise (real estate knowledge) as needed and pay partial prices either as you go or at the closing. This is accomplished by breaking the real estate transaction into component services. A user of the system may be a buyer of real estate or another person such as a broker.

In one embodiment, a real estate transaction begins by a client starting a search for properties. The System uses the search criteria and obtains the Multiple Listing Service (MLS) information. As used in this specification, an MLS system is an electronic database for real estate that enables access to data among brokers that represent buyers and sellers in order to facilitate the sharing of information about various properties. Then, the system quantifies the transaction body of knowledge into different components of knowledge and calculates the partial pricing for these services. This quantification enables buyers to purchase only the transaction expertise they need.

A partial transaction module creates pricing for all service components of a real estate transaction. It combines rules from the rule-set module with the search result data to create partial transaction data. A buyer may select any combination of these partial service components (real estate knowledge) needed to complete the purchase transaction. For each of these services he can select an agent, also referred to herein as a broker, who will provide the service.

In one embodiment, clients start the purchase process of buying agent services by accessing a Sandbox Module (106) and specifying a price they are willing to pay in a desired location, that is, in a specific town, neighborhood or other area. The Sandbox Module (106) allows buyers, also referred to herein as clients or purchasers, to obtain price estimates for different parts of a real estate transaction. Clients can compare savings for different selections of services, including individual services (ala carte services) as well as services grouped into service packages.

In alternative embodiments, a form of purchase payment is selected, such as pay as you go or deferred payment (at the end of transaction).

Any information associated with the partial transactions is preferably stored and accessed by the computer, for example through relational databases, digital files, Read-Only Memory (ROM), Random Access Memory (RAM), lookup tables, mobile devices and various caches.

Once the search result data is obtained, clients can select multiple properties and place selected ones on a short list of properties. The purpose of the short list is to enable clients to analyze which components of a transaction (knowledge) they might require to complete the property purchase and compare impact of their selection on the cost of the transaction. In one embodiment, the short list is a shopping cart that can hold the selected properties and related data.

In one embodiment, for each selected property in the short list, the client may select all or partial service components for transfer to a second shopping cart linked to the short list shopping cart (linked shopping cart). For each of these services, the client may select and add an agent to a third shopping cart that is linked to the transaction services shopping cart (multi-linked shopping cart).

In preferred embodiments, each property in the short list with all associated linked shopping carts content may be moved to checkout. Moving to checkout simply means that the user selects a button to proceed with a purchase of the property.

In various embodiments, after moving to checkout, the purchase contract for the transaction services is generated and services being acquired are paid for using different forms of payments. Preferably, after moving to checkout, a service invoice for services is generated. Subsequently, once a payment method is selected, the Client (150) is provided with an "interpretation" of their selections. Clients have options to cancel, modify or move forward with the payment at that time according to the selected method of payment. At that time, a contract is prepared and submitted for signature.

FIG. 1 is an illustration of a system-level example, in accordance with various embodiments in which a real estate knowledge quantification process can be deployed and executed on a system (100) connected to a network (145), preferably a wide area network such as the Internet. The wide area network allows the system (100) to be access remotely by its users including clients and access other elements of the system that are not physically located with the system (100). The system (100) includes a Real Estate Rule-Set Module (102) that holds rule-sets used for real estate knowledge quantification, and a Partial Transaction Module (104) that enables a real estate transaction to be divided to parts (components) according to the rule-sets from the Real Estate Rule-Set Module (102).

The system (100) includes a Linked Shopping Cart Module (105) that enables clients to select various properties together with client selected agent services needed to purchase these properties and agents to perform selected services.

The system (100) includes a Sandbox Module (106) that allows clients to obtain estimates of property prices and estimates of prices for transaction services to be provided by one or more agents (referred to also as agent services) and estimates of savings for clients.

The system (100) includes a Search Module (108) that facilitates search for real estate properties according to the search criteria selected by clients and a Checkout Module (110) that facilitates payments for selected agent services.

Other Modules (112), such as an administrator module may also be included in the system (100). The administrator module allows for maintenance of the system (100). System (100) maintenance includes, for example, modification of rule-sets, access and processing of data stored in the Database (120) and other commonly known system administration functions. Modules are preferably integrated with one another while preserving functionality.

The system may also include an interface layer (135), such as a Graphical User Interface (GUI), and a security layer (140) that provides authentication and authorization services for various users of the system. The interface layer (135) increases usability of the system (100) for clients to allow them to acquire individual transaction services that were previously embedded in full service provided by real estate agents for a fixed commission or percentage of the sales price.

In FIG. 1, a Client (150) or any number of clients may be connected to the Internet and obtain access to services from the system (100). Other users of the system may also include listing agents (or sellers agents), selling agents (or buyers agents), administrators, commercial third party users of various external systems (125) and the like. External systems, such as for example tracking and analysis systems, help in recording information used for development of the rule sets in the Real Estate Rule-Set Module (102) and help in the administration of the system (e.g. to improve its performance).

In one embodiment, the Multiple Listing System (MLS) data systems (130) is one or more MLS data systems. As used herein, an MLS system is an electronic database for real estate that enables access to data among brokers that represent buyers and sellers in order to facilitate the sharing of information about various properties.

Figure 3:
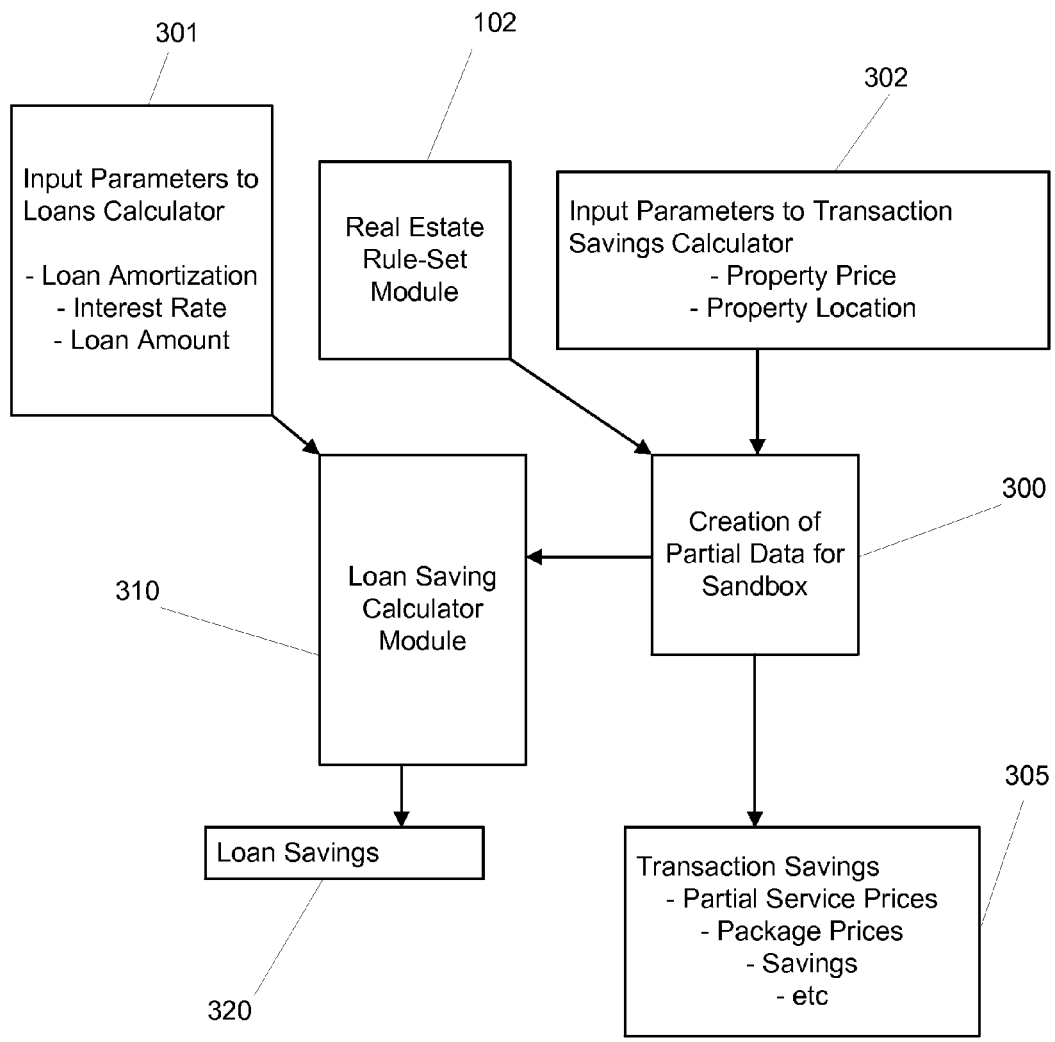
FIG. 3 is a specific embodiment of a sandbox user interface allowing clients to obtain cost estimates for partial transaction services and packages.
Figure 5:
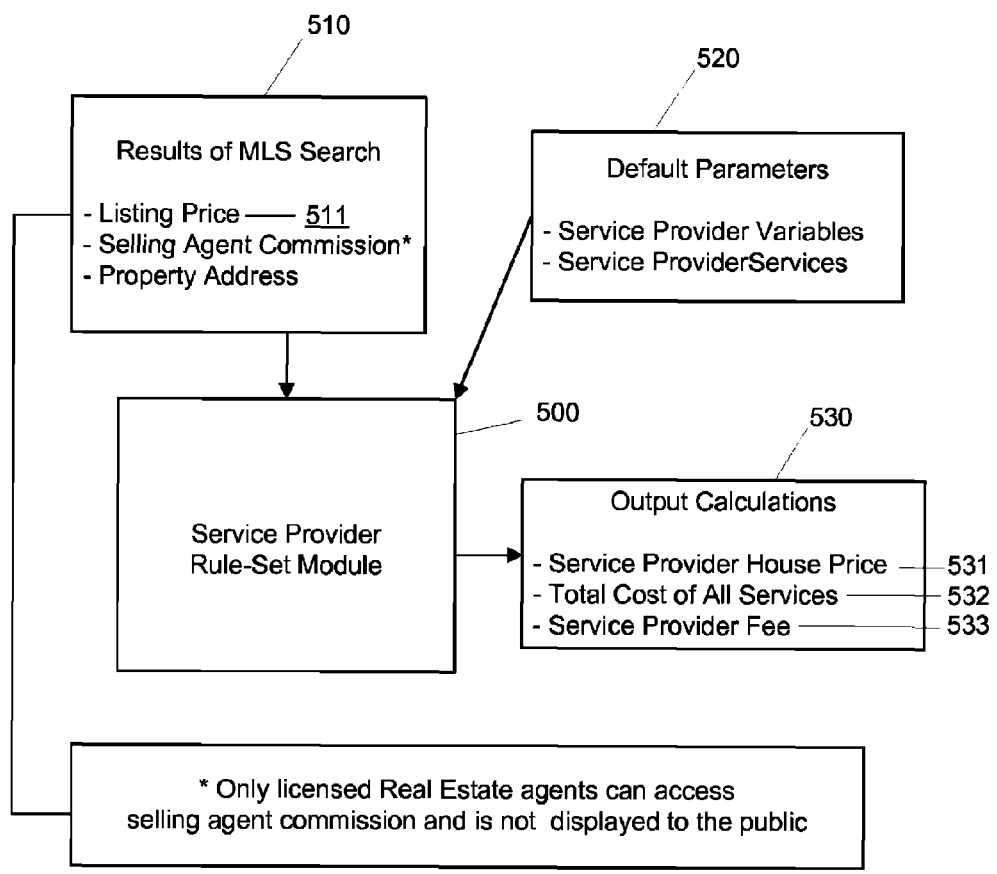
FIG. 5 is an exemplary service provider rule-set module diagram.
Figure 6:
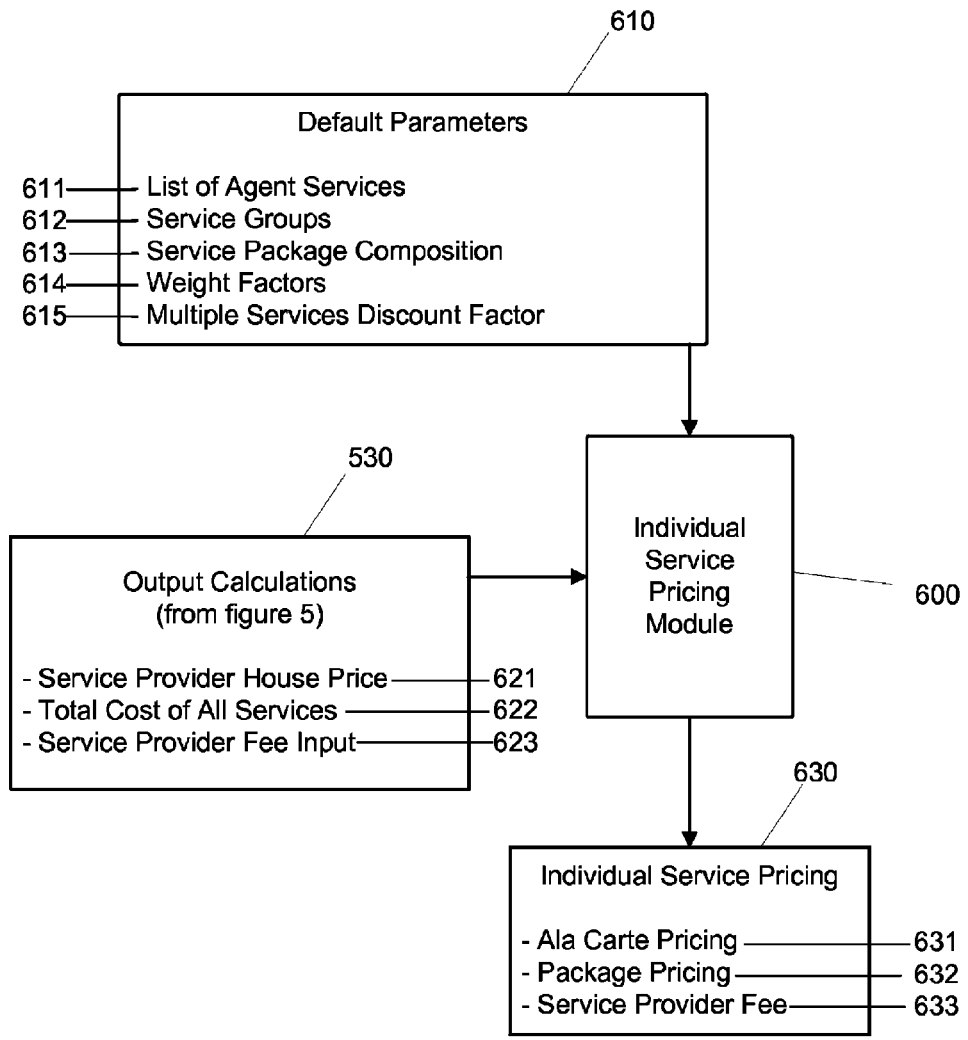
FIG. 6 is an exemplary illustration of partial transaction module (individual service pricing module).
Figure 8:
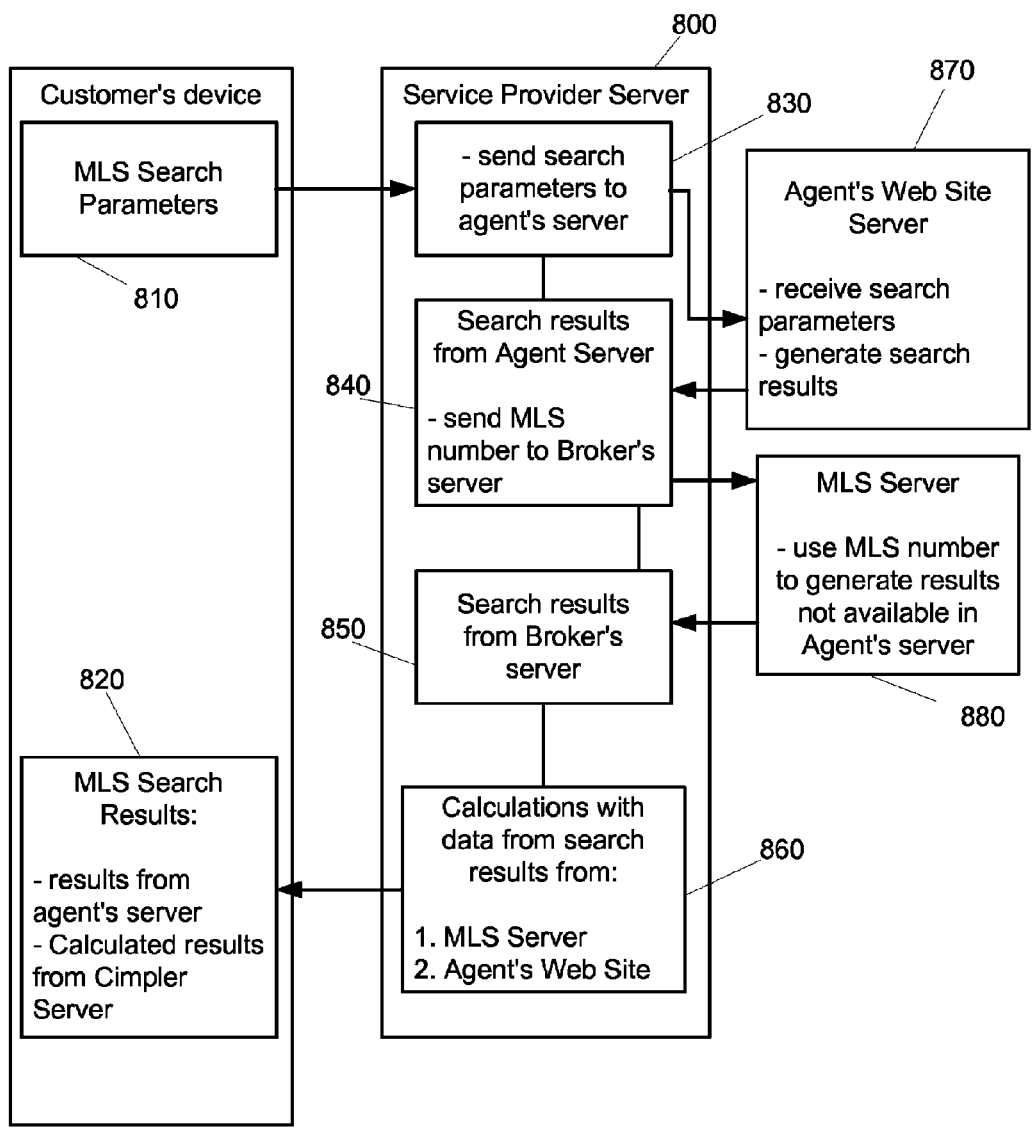
FIG. 8 is an exemplary illustration of the Search Module.

In one embodiment, the system (100), may include a Real Estate Rule-Set Module (102) (details of which are shown in FIG. 5), and a Partial Transaction Module (104)) (details of which are shown in FIG. 6), a Shopping Cart Module (105) that is linked, a Sandbox Module (106) (details of which are shown in FIG. 3), a Search Module (108) (details of which are shown in FIG. 8) and a Checkout Module (110). Other Modules (112), such as an administrator module may also be included in the system (100). The illustrated modules can be integrated with one another in various ways, so long as certain functionality is preserved. In various embodiments, the system (100) may also include an interface layer (135), such as a graphical user interface (GUI), and a security layer (140) that provides authentication and authorization services for various users of the system (100).

The Search Module (108) is a software component that performs MLS searches based on the search criteria provided by any Client (150). The Search Module (108) can access different MLS data systems (130) based on the information submitted by clients (home buyers or any people interested in searching for homes).

Figure 4:
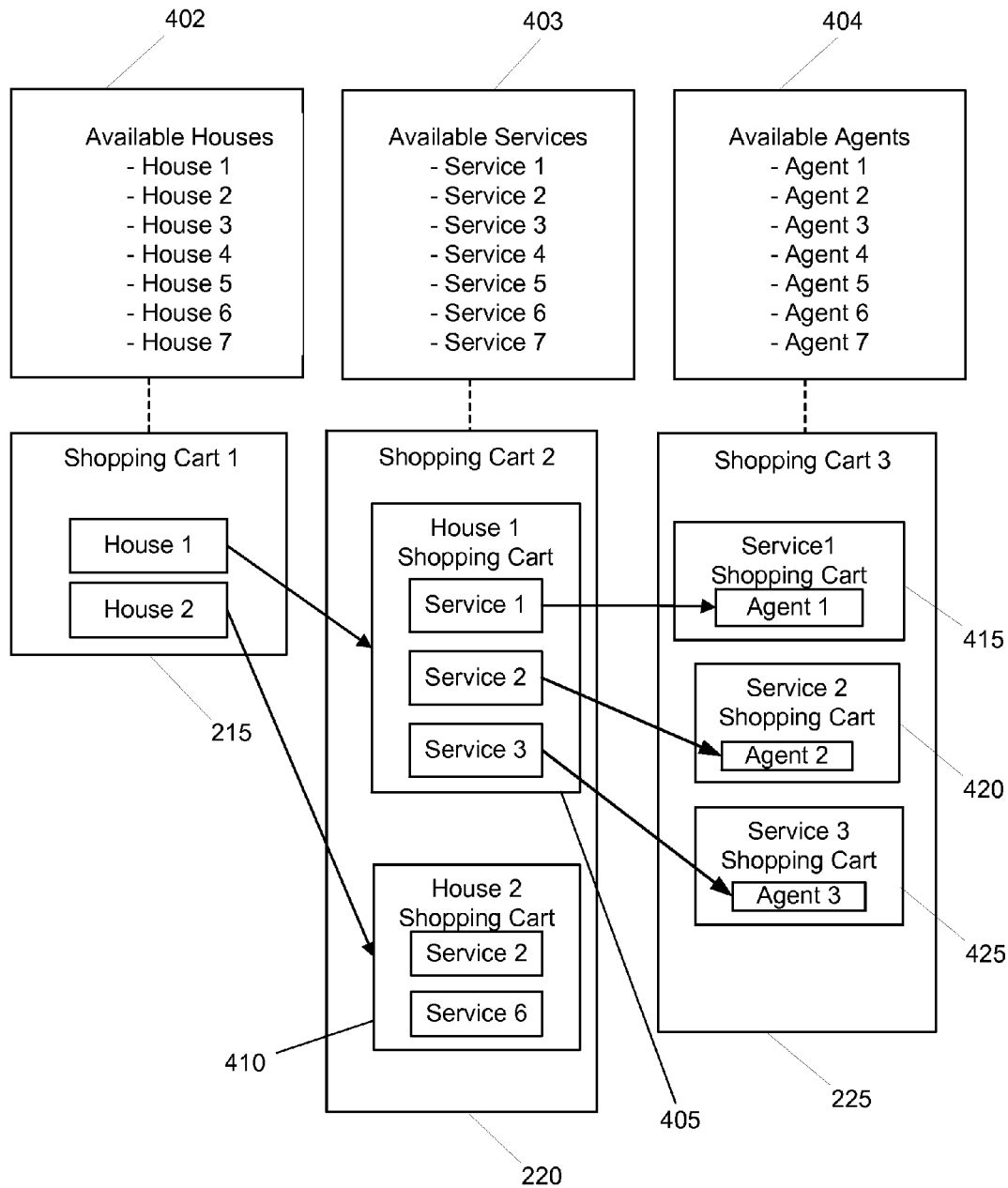
FIG. 4 is an exemplary illustration of a linked shopping cart process allowing purchasing services for selected properties and allocating agents to each service.

In one embodiment, the Search Module (108) allows clients to place properties to the short list (wish list) of properties in the Shopping Cart Module (105) that is linked, as presented in FIG. 4. Clients may add selected partial transaction services and agents to perform these services, as it is illustrated in FIG. 4.

In one embodiment, the Partial Transaction Module (104) is a software application that can import a list of properties returned from the Search Module (108) then apply a set of rule-sets in the Real Estate Rule-Set Module (102). The rules enable partitioning (disassembly) of agent service to purchase a property to individual components. An example of rule-sets and how they are applied is presented in FIG. 5 and FIG. 6. The Real Estate Rule-Set Module (102) contains rules and algorithms that, once applied to search results, breaks down a transaction process into partial transaction services, meaning separate real estate agent services such as assistance in home viewing, price analysis, contract preparations or contract negotiations for each selected property with each components specified cost. The partial transaction data, such as mentioned before is presented to any Client (150). Subsequently, individual service components are priced according to service-provider pricing information, as shown in FIG. 6. A service provider is a real estate broker licensed/permitted to provide real estate services. A service provider is also any other provider of services incident to a purchase of the real estate property, such as an engineering inspection service provider. Services can be offered individually or in packages as defined by service providers.

Additionally, any Client (150) is allowed to make a choice of how and when to pay for agent services, by choosing payments as you go after agent services are provided or at the end of the purchase process. Details of the payment process and impact of payments on client savings are presented in FIG. 7.

The data associated with each client selections, such as search criteria and search results and partial transaction selection can be persisted in a database (120) accessible by the various modules of the system, such as a relational database, repository or data management system.

In one embodiment, clients collect the selected partial purchase transaction service information, such as assistance in home viewing, price analysis, contract preparations, contract negotiations or contract execution in the Shopping Cart Module (105) that is linked. The shopping carts include the short list of homes (details of which are presented in FIG. 4, referred to also as wish list), the partial list of transaction services as mentioned above generated by the Partial Transaction Module (104) and information on agents assigned (buyers have a choice to choose a different agent for each transaction or they can select the same agent for all) to perform selected services. The Checkout Module (110) is a component collecting information regarding partial transaction services selected by buyers from the Shopping Cart Module (105) that is linked (details are shown in FIG. 4). In various embodiments, each property in the short list with all associated linked shopping carts content is moved to checkout. For each property, linked shopping cart includes associated transaction services and agent information. Clients select form of payment, such as a credit card or deferral (to be paid at closing of transaction).

In one embodiment, the Sandbox Module (106) (details are shown in FIG. 3) is a component of the system (100) responsible for creating estimates of transaction costs for different properties and different selections of services by clients. Clients can select different parts of transaction services they might want to acquire, different payment methods they might want to use and to analyze possible savings for multiple search results. The sandbox module uses price and location data provided by clients, which is preferably not data imported from the MLS data systems (130). The input data to sandbox may not have any specific home associated with it, but may be an arbitrary price and a zip code. Preferably, the input data are a price and zip code. Other additional information, such as broker defined maps or location information, is recommended to improve the system's ability to acquire location specific knowledge.

Figure 2:
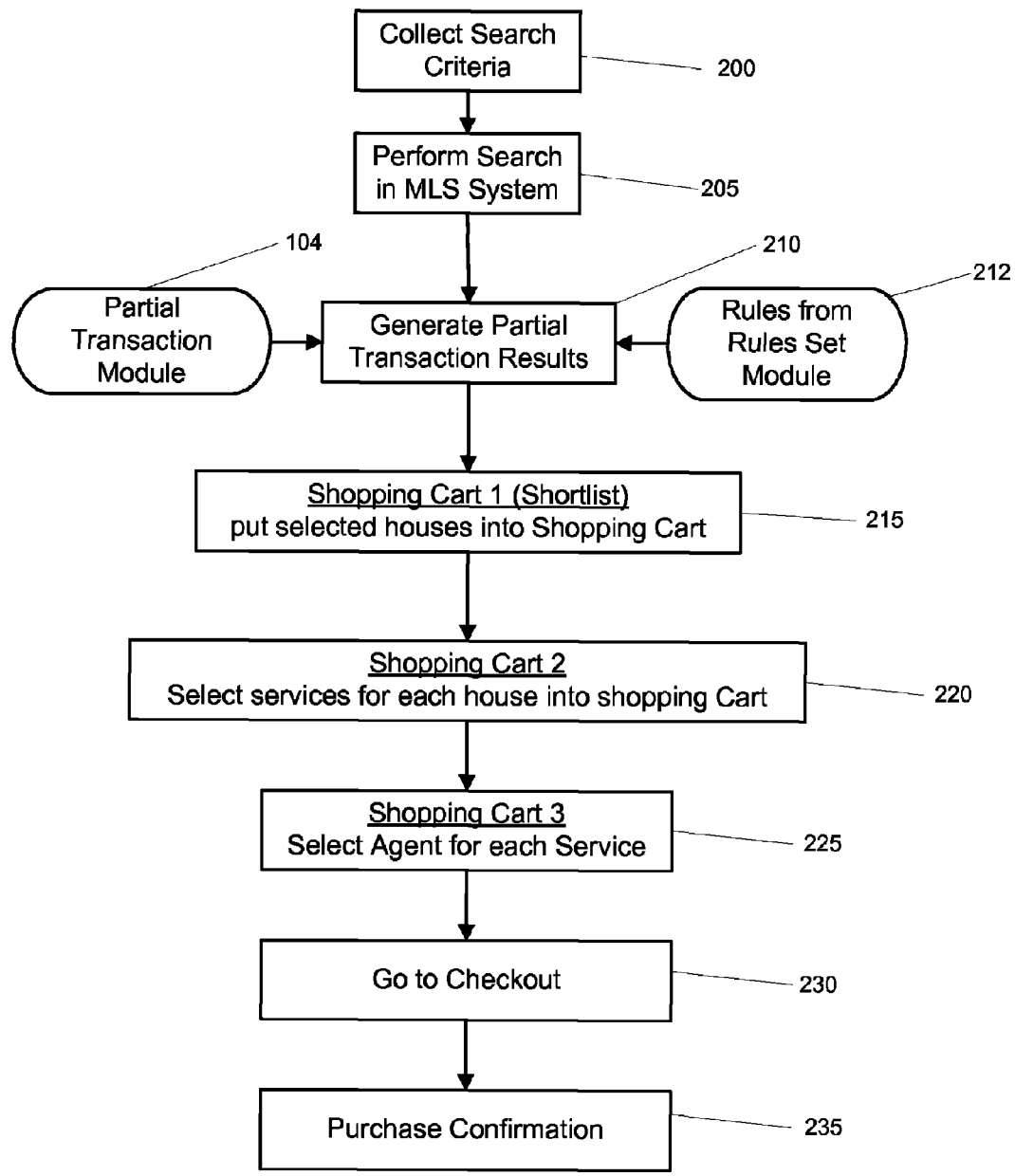
FIG. 2 is an exemplary general process flow chart diagram in accordance with various embodiments.

FIG. 2 is an exemplary flow chart diagram of a general process of real estate knowledge quantification in accordance with various embodiments. The first box, Collect Search Criteria (200), represents a step wherein the Client (150) may enter search criteria, such as number of bedrooms, price range or location. The next box, Perform Search in MLS System (205), the search criteria are transferred to MLS data systems to facilitate property search. Search result data is returned to system (100). In various embodiments, different search data as mentioned above is collected and transferred to various MLS data systems.

The box, Generate Partial Transaction Results (210), may be implemented by a Partial Transaction Module (104) that fetches the rule-sets from a rule-set module, indicated by the box, Rules from Rule Set Module (212), and creates pricing for all service components of a real estate transaction (partial transaction service prices). Different rule sets can be used in different embodiments depending on search results that requested the rule-set data. Examples of different rule sets are given in FIG. 5A, which is a diagram of an exemplary rule-set module.

The box, Shopping Cart 1 (Shortlist), put selected houses into Shopping Cart (215), illustrates a step implemented when clients select one or more properties and add those one or more properties to the short list (Shopping Cart 1).

The box, Shopping Cart 2, Select services for each house into shopping Cart (220), illustrates that in different embodiments clients may select different partial service components (services performed by agents) by different commonly known methods or to be invented later such as selectable or radio (mutually exclusive) buttons to the linked shopping cart two.

The box, Shopping Cart 3, Select Agent for each Service (225), real estate agents are selected for each transaction service by the client and added to the linked shopping cart three. It is possible to select one agent for each service, one agent for multiple services or one agent for all selected services.

The box, Go to Checkout (230), illustrates a step where property or properties in shopping cart one, are linked partial transaction services from Shopping Cart 2 and selected agents to are to perform them as described above and selected agents from the shopping cart 3. These would be preferably transferred to the Checkout Module (110). A payment method is preferably selected in the Go to Checkout (230) step.

The box, Purchase Confirmation (235), is implemented when clients receive purchase confirmation, including the list of purchased services, payments made and payments pending.

FIG. 3 is an exemplary embodiment of a sandbox user interface or Sandbox Module (106) as presented in FIG. 1. The box, Creation of Partial Data for Sandbox (300), is intended to illustrate a step performed by a client in entering price data and location for a transaction. It would be implemented when rules and algorithms are fetched from the Real Estate Rule-Set Module (102) in FIG. 1 and diagram of which is presented in FIG. 5. This allows for creation of partial transaction service costs for arbitrary house prices and locations (without any specific home being selected. In other words it shows clients how much they would have to pay for partial transaction services if they buy a house for a certain price, e.g. $1,000,000, in the zip code ABCDE). Different rule sets can be used in different embodiments dependent on search results that requested the rule set data.

Another FIG. 3 box is: TRANSACTION SAVINGS, Partial Service Prices, Package Prices, Savings, etc. (305). This box represents a step in which one or more clients (150) select and obtain price estimates of different parts of real estate transactions, like contract preparation, or contract execution. Any Client (150) might select different partial service components by different commonly known methods, such as with mutually exclusive selectable buttons, such as radio buttons. Any Client (150) may select data associated with a property price only (and not specific property) they might consider for purchase. A Client (150) would typically analyze the partial data illustrating service transaction savings for each property to make a decision regarding the property and services they might acquire to facilitate the purchase of the property.

Another FIG. 3 box is Loan Saving Calculator Module (310). This box represents a step in which the Client (150) enters data, which is indicated by box: Input Parameters to Loans Calculator, Loan Amortization, Interest Rate, Loan Amount (301). Typical of such data is the loan amortization period, interest rate and loan amount. The Client (150) also enters other data, as available, and this is represented by the box: Input Parameters to Transaction Savings Calculator, Property Price, Property Location (302). These client-provided data are combined with the selected data from the Partial Transaction Module (104) of the sandbox, which is represented by the box: Creation of Partial Data for Sandbox (300) which draws upon the Real Estate Rule-Set Module (102). Results from Creation of Partial Data for Sandbox (300) produce Transactions Savings (305) and are fed into the Loan Saving Calculator Module (310). The Loan Saving Calculator Module (310) calculates Loan Savings (320) resulting from lower transaction costs.

The Loan Saving Calculator Module (310) includes a loan calculator that is a conventional calculator, commonly used in real estate and mortgage industries. However, its purpose is unique, as it helps to determine the Loan Savings (320) to the Client (150) obtained by reducing the loan amount. Because the Client (150) can reduce the loan amount by purchasing partial transaction services from agents, the Client (150) is entitled to reduce the loan amount and thus obtain significant savings over the loan amortization period. The loan calculator in the Loan Saving Calculator Module (310) calculates long term loan savings for clients and presents those in addition to savings obtain by buying and selecting partial transaction services.

FIG. 4 is an illustration of a system-level example of the Shopping Cart Module (105) that is linked that may be used. FIG. 4 illustrates the primary shopping cart, Shopping Cart 1 (215), is linked to a secondary shopping cart, Shopping Cart 2 (220), and Shopping Cart 2 (220) is linked to a tertiary shopping cart, Shopping Cart 3 (225). Shopping Cart 1 (215) is the same Shopping Cart 1 (215) of FIG. 2; Shopping Cart 2 (220) is the same Shopping Cart 2 (220) or FIG. 2; and, Shopping Cart 3 (225) is the same Shopping Cart 3 (225) of FIG. 1. Although this diagram depicts components as logically separate, such depiction is merely for illustrative purposes. It will be apparent to those skilled in the art that the components portrayed in FIG. 4 can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from FIG. 4 without departing from the scope of the various embodiments.

In Shopping Cart 1 (215), any Client (150) may select properties to place into the short list referred to also as wish list. In this example, the client can select a finite number of homes returned from the search. These homes are the pool of homes that the buyer can select and place on the short list (wish list). This wish list is the first linked shopping cart. It will be apparent to anyone skilled in the art that this linked shopping cart can embody any one of many items types to be placed in this linked Shopping Cart 1 (215). This linked Shopping Cart 1 (215) contains homes that were placed in the short (wish) list from the property search results. It represents all the homes that the Client (150) is interested in looking into further. For illustrative purposes, the user has selected House 1 and House 2 (Shopping Cart 1 (215)) from the pool of available houses (402) to place in linked Shopping Cart 1 (215).

In the example represented by FIG. 4, the first home (House 1) in linked Shopping Cart 1 (215) and the Client (150), or any user, then selects services 1, 2, 3 for house 1 (Shopping Cart 1 (215)). For simplicity, Client (150) is used but it should be recognized that it may be a user of any kind. The Client (150) finishes the service selection (Service 1, Service 2 and Service 3 from service pool, to with, Available Services (403)), then the Client (150) selection is placed in the House 1 Shopping Cart (405)) and they are Service 1, Service 2, and Service 3.

Available Services (403) represents the pool of services that the client may select from. Examples of such services include, but not limited to, tours, price analysis, home comparison, review and analysis of disclosures, personal consulting, etc.

For House 2 in Shopping Cart 1 (215), Services 2 and Service 6 are selected and they are illustrated in House 2 Shopping Cart (410). These services (Service 2 and Service 6), for example may include contract preparation and negotiations or any kind of services that are required to perform a real estate transaction. These services are selected from the pool of services, that is from Available Services (403), and are put in their own shopping carts, which are distinct shopping carts: one for each client's selected home. For instance, Shopping Cart 1 (215) has client-selected House 1 and client-selected House 2 from the pool of houses, as shown in Available Houses (402).

After the user or the Client (150) has made selections: House 1 and House 2, the Client (150) may proceed and select services from the Available Services (403), which is a pool of available services for each of the previously selected houses (House 1 and House 2) in the Shopping Cart 1 (215). The services may be any kind of service to enable the implementation of a real estate transaction. For instance, the Client (150) may select Service 1, Service 2, and Service 3 from the Available Services (403) for selected House 1 in Shopping Cart 1 (215).

After the Client (150) selects services from a service pool, that is Available Services (403), these services are incorporated into a new shopping cart, Shopping Cart 2 (220). Shopping Cart 2 (220) is one shopping cart for each service group selected for each user or Client (150) selected house present in Shopping Cart 1 (215).

The user or Client (150) may proceed and check Service 2 and Service 6 from the Available Services (403) and these selected services are then placed in Shopping Cart 2 (220), that is the secondary shopping cart, as Service 2 and Service 6. So, for each user or Client (150) selected house from Available Houses (402) in the primary shopping cart Shopping Cart 1 (215) will have a secondary shopping cart Shopping Cart 2 (220) containing services from the Available Services (403).

Shopping Cart 3 (225) is also linked with Shopping Cart 1 (215) and Shopping Cart 2 (220) in FIG. 4. For each of the services in Shopping Cart 2 (220), an agent from Available Agents (404), which is a pool of such agents, may be selected to perform one or more of the selected services (Service 1, Service 3, or Service 3) in Shopping Cart 2 for House 1 Shopping Cart (405) and to perform selected services (Service 2 and Service 6) in House 2 Shopping Cart (410). FIG. 4 shows that different agents may be selected for each service in linked Shopping Cart 2 (220): Service 1, Shopping Cart, Agent 1 (415), Service 2, Shopping Cart, Agent 2 (420) and Service 3, Shopping Cart, Agent 3 (425). Agents are selected by the user or Client (150) for each service and added to the linked shopping cart, Shopping Cart 3 (225).

For example, Agent 1 is in the third linked shopping cart selected for Service 1 in which is linked to House 1 Shopping Cart (405) in the Shopping Cart 2 (220), which is linked to House 1 in Shopping Cart 1 (215). Similarly, Agent 2 was selected to perform Service 2, which is linked to House 1 Shopping Cart (405) in the Shopping Cart 2 (220), which is linked to House 1 in Shopping Cart 1 (215). As an example, Service 1 may involve tours, so the user or Client (150) may select Agent 1 from the area where the home is located. If, for example, the home is in San Mateo, Calif., selecting an Agent 1 who works and sells homes in San Mateo may be preferable.

For Service 2 in House 1 Shopping Cart (405), Agent 2 is someone who might perform price analysis, and the Client (150) selected Agent 2 because that agent sold many homes in different areas and can provide a better comparison of a broader area. The Client (150) could have alternatively decided to stay with the same agent for a more local price analysis. For Service 3 in Shopping Cart 3, Agent 3 performs another function not performed by Agent 1 or Agent 2.

Agent data is used to help the Client (150) make a selection and they may include where agent is registered, his particular expertise, years as an agent etc. In different embodiments, users or clients can select the different partial service components for each house in Shopping Cart 1 (215) by different commonly known methods such as selectable or radio (mutually exclusive) buttons to Shopping Cart 2 (220). House 2 Shopping Cart (410) has Service 2 and Service 6 selected and these are completely independent of House 1 Shopping Cart (405) in Shopping Cart 2 (220).

The use of multiple shopping carts is a benefit of the disclosed method. For each home in the primary shopping cart, Shopping Cart 1 (215), there is a secondary shopping cart, Shopping Cart 2 (220) holding a House designated shopping cart. For example, for each service in House Shopping Cart 1 (405), there is a corresponding agent in the tertiary shopping cart, Shopping Cart 3 (225).

House 1 in the first shopping cart has a corresponding second shopping cart, House Shopping Cart 1 (405) and for each service in the corresponding second shopping cart there is a corresponding agent in the third shopping cart with a corresponding Agent performing the service. Thus, in FIG. 4, House 1 in the first shopping cart has a corresponding second shopping cart with services: Service 1, Service 2, and Service 3. For Service 1 in the second shopping cart, there is a corresponding Agent 1 at the third shopping cart; Service 2 in the second shopping cart has a corresponding Agent 2 in the third shopping cart; and, Service 3 in the second shopping cart has a corresponding Agent 3 in the third shopping cart. Thus, there are three linked shopping carts in preferred embodiments. The first shopping cart is linked to a second shopping cart and the second shopping cart is linked to a third shopping cart.

For each selection of the first shopping cart there will have one or more associated selections on the second shopping cart, and, for each selection of the second shopping cart will have at least one other selection at the third shopping cart associated with each selection of the second shopping cart. The explanation for a tertiary shopping cart associated with the secondary shopping cart applies to the secondary shopping cart, except, secondary shopping cart does have an associated tertiary shopping cart but it is not shown for sake of simplicity and to avoid redundancy, since the explanation for secondary shopping cart and tertiary shopping cart applies to secondary shopping cart as well.

Figure 4A:
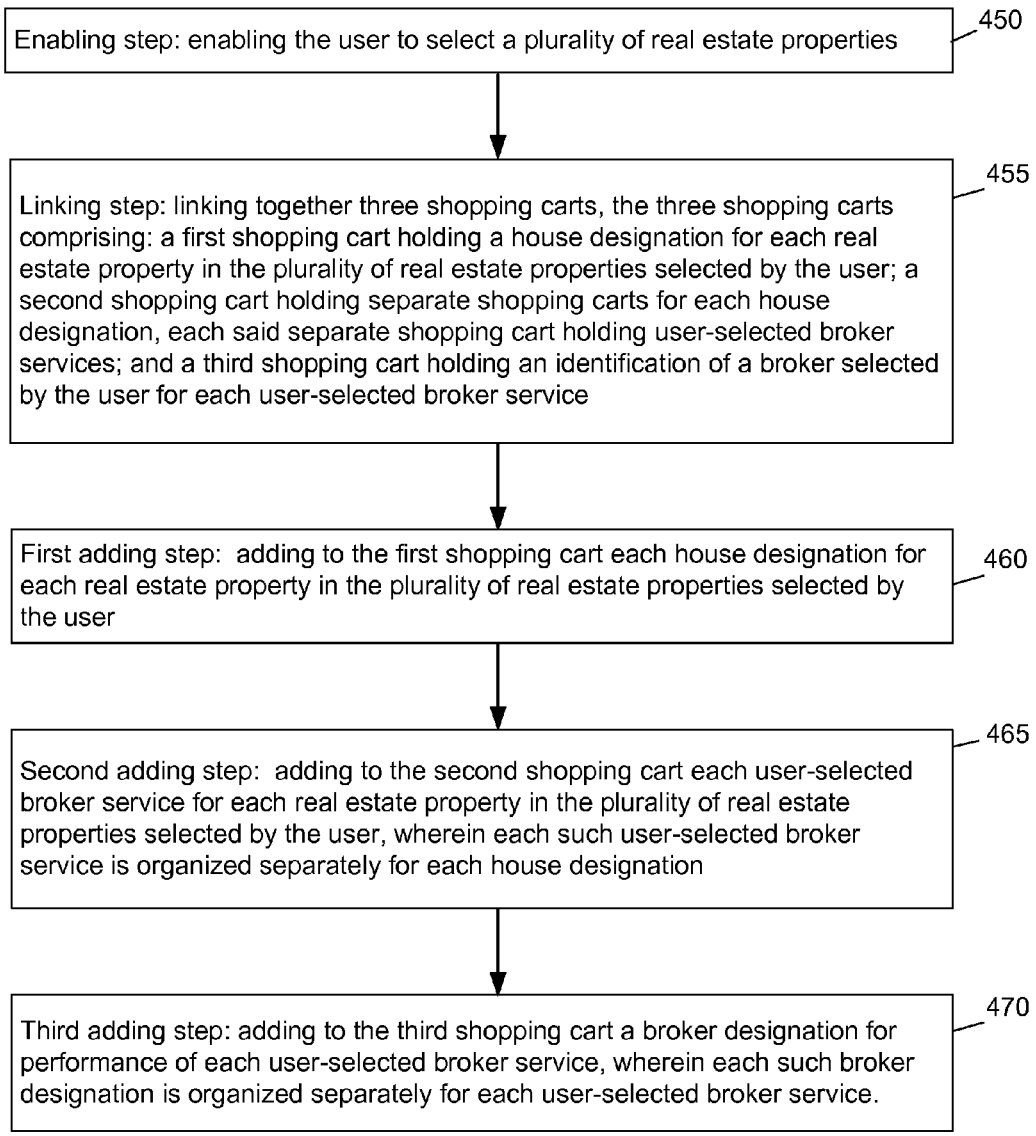
FIG. 4A illustrates an embodiment of the multiple linked shopping cart of the system.

FIG. 4A illustrates an embodiment of the multiple linked shopping cart of the system. It comprises five steps.

One of these five steps is an Enabling step (450): enabling the user to select a plurality of real estate properties.

Another of these five steps is a Linking step (455): linking together three shopping carts, the three shopping carts comprising: a first shopping cart holding a house designation for each real estate property in the plurality of real estate properties selected by the user; a second shopping cart holding separate shopping carts for each house designation, each said separate shopping cart holding user-selected broker services; and a third shopping cart holding an identification of a broker selected by the user for each user-selected broker service.

Another of these five steps is a First adding step (460): adding to the first shopping cart each house designation for each real estate property in the plurality of real estate properties selected by the user.

Another of these five steps is a Second adding step (465): adding to the second shopping cart each user-selected broker service for each real estate property in the plurality of real estate properties selected by the user, wherein each such user-selected broker service is organized separately for each house designation.

Another of these five steps is a Third adding step (470): adding to the third shopping cart a broker designation for performance of each user-selected broker service, wherein each such broker designation is organized separately for each user-selected broker service.

In the embodiment represented by FIG. 4, each house in Shopping Cart 1 (215) can have any number of partial service components linked to each house, and an agent linked to each partial service component.

The method disclosed herein may be implemented for content hosting (first content host) where one or more contents (first contents) from the first content host (which parallels to the primary shopping cart) may be used to select one or more contents (second contents) at a second content host (which parallels the secondary shopping cart) and the second content from the second content host may be used to select one or more content (third content) from a third content host (which parallels the third shopping cart).

When three content hosts are involved, a user selects a first content from a first-content list and the first content is incorporated into the first content host, next the user selects the incorporated first content from the first host and a second-content list is displayed to the user and the user selects one or more second contents from the second-content list and the user selected second content is included into a second content host, and after the user selects the included second content from the second content host a third-content list is presented to the user and for the user selection and once the user selects one or more of the third contents from the third-content list the selected third content is included into a third content host.

While the concept of linked shopping carts or content hosts has primary application to the field of real estate, it may be used in other fields in an e-commerce transaction. For instance, the invention may be used in selecting goods for sale that requires further selection from other sellers. For example, if a buyer purchases a particular item, a car for instance, and the car is placed in the first shopping cart. The buyer may then select the car from the first shopping cart and a list of other sellers offering goods for the car, like car accessories and car insurance, is displayed to the buyer and the buyer may now select an insurance company from the list, for instance insurance company ABC and the insurance company ABC is placed in the second shopping cart. Finally, the buyer selects the insurance company ABC from the second shopping cart and a list of agents associated with the insurance company ABC is displayed for the buyer's selection and after the buyer selects an agent the agent is placed in the third shopping cart.

FIG. 5 illustrates the operation of an exemplary Real Estate Rule-Set Module (102) from FIG. 1. The search results from Search Module (108) are gathered in Result of MLS Search (510). These results may include items such as Listing Price, Selling Agent Commission, Listing Agent Commission and Property Address. Further variables are gathered in Default Parameters (520). The variables in Default Parameters (520) are preset by the Service Provider, who is typically a real estate brokerage licensed and/or authorized to perform real estate transactions on behalf of clients. Examples of Service Provider variables are Service Provider Price, Service Provider Fee or Service Providers Cost. Examples of Service Provider Services (services provided by a Service Provider) are purchase agreement addendum modifying the selling price, opening escrow or communication between buyer and listing agent. The Service Provider is the entity through which the partial transaction services are provided by the Real Estate Agent to the Client. The variables preset in the Default Parameters (520) may include a factor that determines the fee for any services provided directly by the Service Provider and can also include formulas and rules used to calculate the total cost of all the partial transaction services provided through the Service Provider by the Real Estate Agent.

Figure 7:
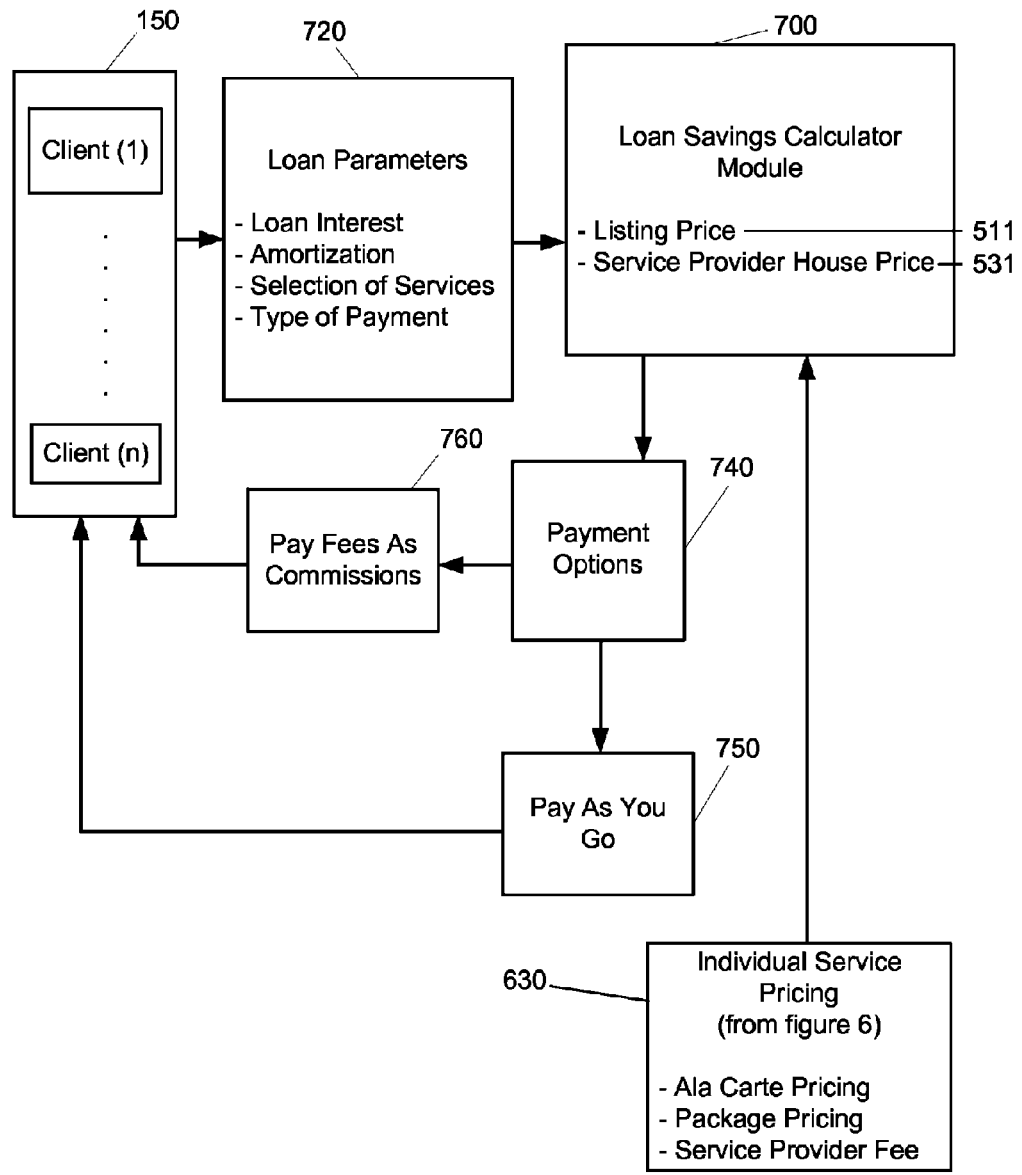
FIG. 7 is an exemplary illustration of loan savings calculation module.

The primary purpose of the operations in the example described in FIG. 5 is to enable Service Providers to customize their real estate knowledge trading services to assist clients in purchasing real estate. A secondary purpose is to prepare data for real estate knowledge disassembling and re-assembling according to rules submitted by Service Providers, as shown in FIG. 6 and FIG. 7.

In the FIG. 5 example, data from the Results of MLS Search (510) and data from the Default Parameters (520) are sent to the Service Provider, Rule-Set Module (500). The Service Provider, Rule-Set Module (500) applies formulas, rules and factors from the Default Parameters (520) to the data in Results of MLS Search (510) and calculates the outputs. These outputs are sent to Output Calculations (530). In one embodiment, the Output Calculations (530) are illustrated as: the Service Provider House Price (531), which in this instance is less than the listing price; the Total Cost of All Services (532), that is, the maximum cost of all the services; and the calculated Service Provider Fee (533). In this embodiment, the Total Cost of All Services (532) and the Service Provider Fee (533) are calculated as fraction of the Listing Price of the house, where the value of the fraction comes from the Default Parameters (520).

Figure 5A:
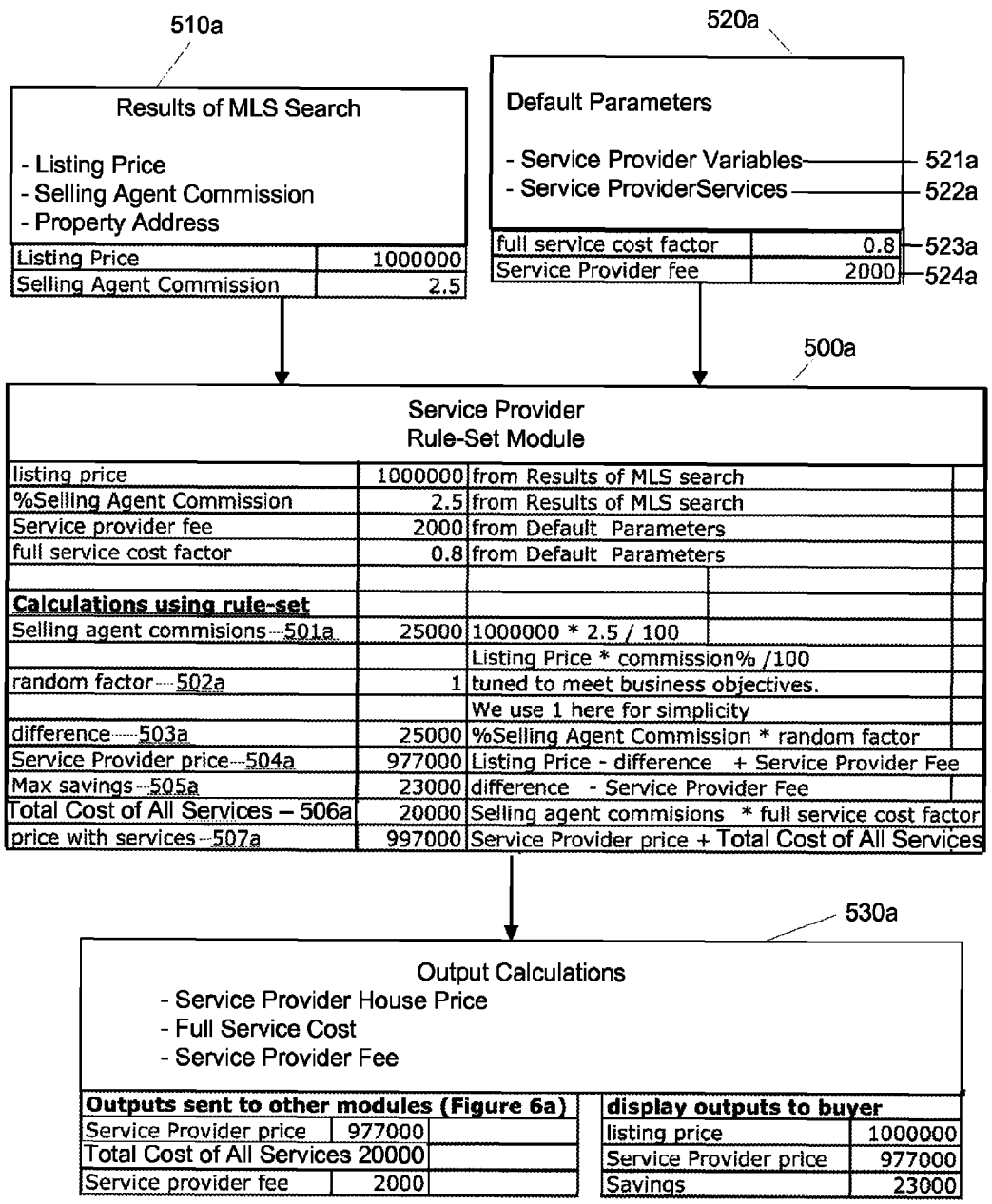
FIG. 5A an illustration a specific embodiment of the mechanism shown in FIG. 5.

FIG. 5A illustrates a specific embodiment of the mechanism shown in FIG. 5. The user does a search using the search module. The results returned by the search are gathered in the Results of MLS Search (510a). In this illustration the Results of MLS Search (510a) now shows Listing Price as $1,000,000 and the Selling Agent Commission as 2.5%.

The Default Parameters (520a) contains the parameters preset by the Service Provider (in this case, a real estate brokerage licensed and/or authorized to perform real estate transactions on behalf of clients). These default parameters affect the behavior of the modules downstream to the data flow. This system can be available to many service providers and they can input the parameters which will configure the behavior of the system when their customers/users use it. The Service Provider can set parameters for the Service Provider Variables (521a) and the Service Provider Services (522a). Two of the Service Provider Variables are shown as follows: Full service cost factor is set equal to 0.8 and the Service Provider fee is set equal to $2000.

In use, the Service Provider, Rule-Set Module (500a) receives input from Results of MLS Search (510a) and Default Parameters (520a). In this illustration Service Provider, Rule-Set Module (500a) receives Listing Price that is equal to $1,000,000, Selling Agent Commission that is equal to 2.5%, Full Service Cost Factor that is equal to 0.8 and Service Provider Fee that is equal to $2000.

The Service Provider, Rule-Set Module (500a) does calculations with the results shown in the table under the heading: Calculations using rule-set. The Selling agent commission (501a) in dollars is calculated as Listing Price*Selling Agent Commission/100 which is $1,000,000*2.5/100 equaling $25,000, where * indicates multiplication and / indicated divided by. A random number between 1 and 0 (or any other range) is generated, called random factor (502a). This random factor (502a) is tuned to meet certain business objectives that are explained in more detail in the explanation of FIG. 8A. For simplicity of explanation, the random factor used here is 1. A variable called difference (503a) is calculated as Selling agent commission in dollars*random factor which is $25,000*1 equaling $25,000.

In one embodiment, the Service Provider price (504a) is calculated as listing price−difference+Service Provider Fee which is $1,000,000−25,000+$2,000 equaling $977,000. The Service Provider price (504a) is the price at which the house is offered, if the buyer comes to the purchase through the service provider. This price is less than the listing price, which is the price if the buyer came to the purchase without the Service Provider. This price may change based on future negotiations with the seller. The Max savings (505a) is calculated as difference−Service Provider Fee which is 25,000−$2,000 equaling $23,000. This is the maximum savings possible for the buyer if he/she comes to the purchase through the Service Provider. The Full service cost (506a) is Selling agent Commission in dollars*full service cost factor which is $25,000*0.8 equaling $20,000.

If the buyer chooses to buy all the partial transaction services, the Price with services (507a) is calculated as Service Provider price+Total Cost of All Services which is $977,000+$20,000 giving $997,000. The results generated by the Service Provider, Rule-Set Module (500a) is used as a basis for further calculations in the modules of FIG. 6, when the services provided by the Real Estate Agent are decomposed into partial transaction services and pricing is assigned to each partial transaction.

Figure 6A:
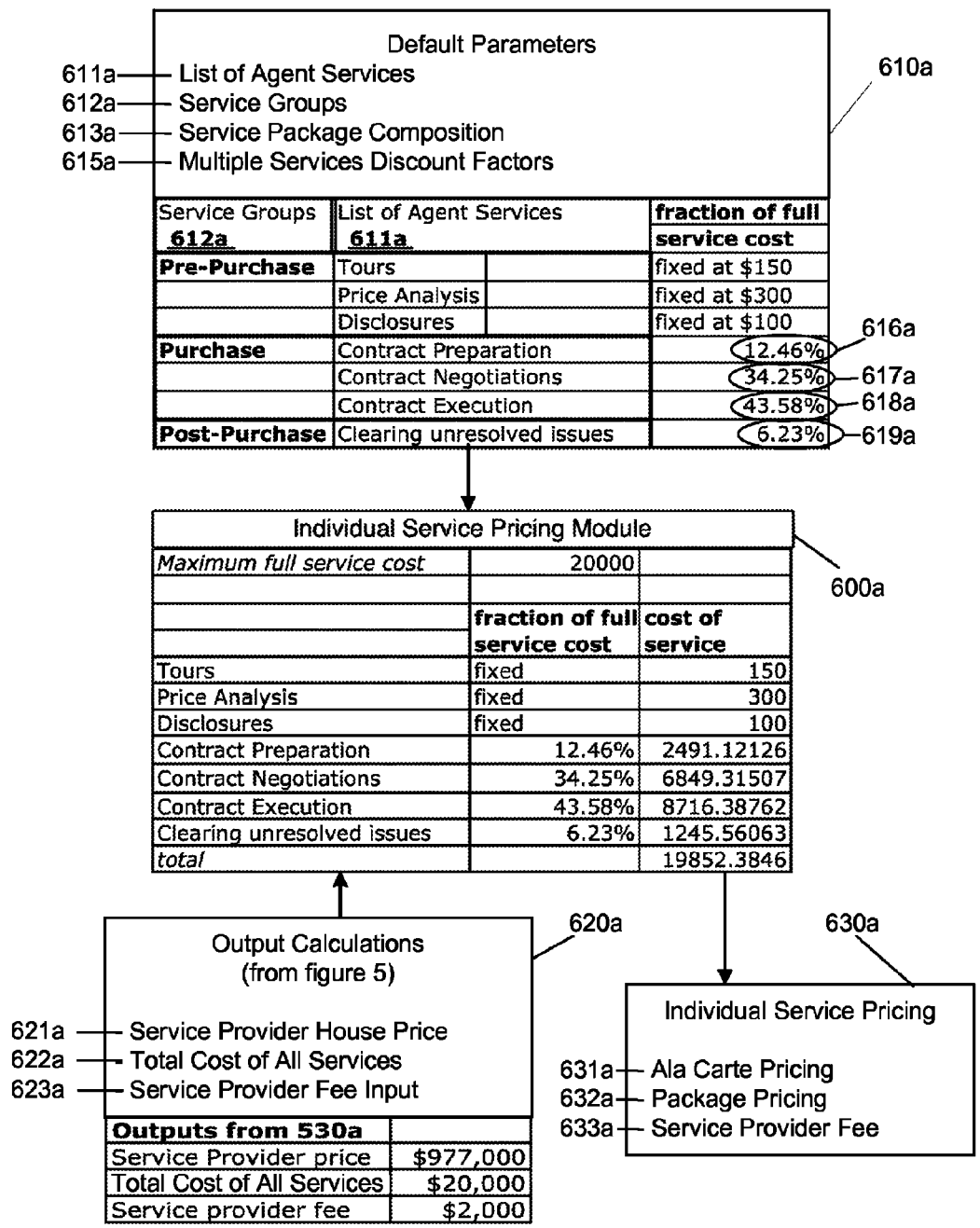
FIG. 6A, FIG. 6B and FIG. 6C are illustrations of a specific embodiment of the mechanism shown in FIG. 6.

The Output Calculations (530a) receive the calculations from the Service Provider, Rule-Set Module (500a). The Output Calculations (530a) may display some of the results to user to show the user the financial implications of purchasing the house thorough the Service Provider. In this illustration, the buyer sees that the listing price is $1,000,000 if the buyer directly approaches the seller, and the price will be $977,000 if he/she approaches the seller through the Service Provider, potentially saving the buyer $23,000. The Output Calculations (530a) may also send the results to other modules for further calculations. In this case, the results are sent to the module in FIG. 6 which is illustrated in FIG. 6A.

FIG. 6 illustrates an example of the operation of the Partial Transaction Module (104) from FIG. 1. The Partial Transaction Module (104) has Default Parameters (610) that include preset values which affect the Partial Transaction Module (104). The Default Parameters (610) are distinct and different from Default Parameter (520) in FIG. 5 that sends the data to Service Provider Rule-Set Module (500). Default Parameters (610) send data to Individual Service Pricing Module (600). Additionally, each default parameter in the Default Parameters Module (610) is stored together with a rule or multiple rules prescribing how to apply them to the data in the Individual Service Pricing Module (600). Output Calculations (530). Data from Output Calculations (530) is also sent to Individual Service Pricing Module (600).

The primary purpose of operations exemplified in FIG. 6 is to disassemble (subdivide) real estate knowledge used by agents when providing full service to clients purchasing real estate. Disassembly is to individual services which are priced according to rules attached to default parameters in the Default Parameters (610). Additionally, individual services can be assembled to service packages according to parameters and rules stored in Default Parameters (610).

Default Parameters (610) includes a number of parameters that may be preset by a Service Provider. The Service Provider is the entity, such as a real estate brokerage licensed and/or authorized to perform real estate transactions on behalf of clients, through which the Real Estate Agent provides the partial transaction services to the Client (150).

Preferably, one of these preset parameters is a list of Agent Services (611), which are partial transaction services that will be provided though the Service Provider. Each item in the list of Agent Services (611) will have a Multiple Service Discount Factor (615) and Weight Factors (614), which are individual weighing factors for calculations of Service Package Composition (613), which is package service pricing. For the purpose of the price disassembly, all individual services with their weighing factors and common discount factor are included in calculations. In one embodiment, there are seven partial transactions services. For the purpose of individual service price calculations, the service provider's full service package price is divided by the Multiple Service Discount Factor (615) and then multiplied by the corresponding Weight Factors (614) for the service.

Another example of preset parameters in Default Parameters (610) is one set by the Service Provider, shown as Service Groups (612). Service Groups (612) is a grouping of partial transactions into stages, such as pre-purchase services, purchase related services and post purchase services. The grouping of the services into stages allows the attachment of pricing rules to each stage. Such pricing rules are stored in Default Parameters (610) and are linked to these parameters. Whenever a selected default parameter is accessed, the attached rule is used to define the way this parameter is used for calculations of the prices of individual modules in the Individual Service Pricing Module (600).

In another embodiment, services stored in Service Groups (612) are used during the pre-purchase stage of the real estate transaction and will have fixed prices unrelated to listing price of the house. These prices will be defined by Service Provider and saved in Default Parameters (610) together with rules how to apply them in the Individual Service Pricing Module (600). The services of the remaining groups may be priced differently. In such case, prices of all individual services provided by a service provider multiplied by the Multiple Service Discount Factor (615) will not add up to the Total Cost of All Services (622).

Another default parameter that may be preset by the service provider is Service Package Composition (613) by which partial transaction services that are different from each other can be grouped or composed into packages. Each parameter is saved with rules instructing the Individual Service Pricing Module (600) how to apply these parameters to calculate prices of packages. In one embodiment, a package can be all the services that are in the purchase-related group along with the service that provides tours, which is in the pre-purchase group. Apart from this package, there can be additional packages that have other compositions of services. Each package will typically have pricing rules attached to it.

In one embodiment, the price of the package combines all services from the Service Group used during the purchase stage of transaction. In this particular case, prices of individual services in this group will be divided by a Multiple Service Discount Factor (615) equal to 1.1 and then be added together. So, in this particular embodiment, the services purchased in the package will be cheaper by 10% from services purchased individually. The reduction amount may be any percentage other than the one illustrated herein or may employ an entirely different rule to be used for calculations of prices for service packages and their components. Rules for the pricing of packages are attached to pricing data in Default Parameters (610).

The data from Default Parameters (610) and Output Calculations (530) are sent to the Individual Service Pricing Module (600). Preferably, the data in Output Calculations (530) is based on a specific house. This will be a house added to the first shopping cart of the linked shopping cart module. The preset default values in the Default Parameters (610), together with attached rules defining how they should be used, are applied to the data in Output Calculations (530). This results in individual pricing for each of the services as well as pricing for the packages. Once this pricing has been calculated, then preferably all the options with their pricing are displayed to the client. The Client (150) selects the services that the Client (150) would like to purchase, which may include packages as well as ala carte items from the list of List of Agent Services (611). The selections of the Client (150) are put in the second shopping cart of the linked shopping cart module and are linked to a specific house in the first shopping cart of the linked shopping cart module. The Individual Service Pricing Module (600) with the Service Provider Fee (633b), that is the price of the items and packages selected to Individual Service Pricing (630). At the final step, based on the client's selections, Individual Service Pricing (630) will detail the Ala Carte Pricing (631) of those services not present in the packages, the Package Pricing (632), Service Provider Fee Input (623) and the Service Provider House Price (621).

FIG. 6A illustrates aspects of a specific embodiment of the module shown in FIG. 6. In Default Parameters (610a) the Service Provider disassembles (subdivides) the real estate knowledge used by agents to provide full service, while assisting clients in purchasing real estate to individual services. Full service is subdivided into Tours, Price analysis, Disclosures, Contract Preparation, Contract Negotiations, Contract Execution and Clearing unresolved issues, which are organized under List of Agent Services (611a). The List of Agent Services (611a) is a list of partial transaction services found within the Service Package Composition (613a).

One of the parameters in Default Parameters (610a) is Service Groups (612a), which is shown as the first column under Default Parameters (610a). The second column is titled List of Agent Services (611a) and is grouped in to three stages, namely Pre-Purchase, Purchase and Post-Purchase. The services in the Pre-Purchase group are Tours, Price Analysis and Disclosures. The services in the Purchase group are Contract Preparation, Contract Negotiations and Contract Execution. The service in the Post-Purchase group is Clearing unresolved issues.

Each item in the List of agent Services (611a) has an attached rule for the pricing of the service. The price of the items in the Pre-Purchase group are fixed and not connected to the price of the house. The service provider has set the price of Tours as $150, the price of Price Analysis as $300 and the price of Disclosures as $100. The pricing in the groups Purchase and Post-Purchase set so that they are a fraction of the Total Cost of All Services (506a). In FIG. 6a, Default Parameters (610a), there are 4 weighting factors and these are: 12.46% (616a) for the service Contract Preparation; 34.25% (617a) for the service; 43.58% (618a) for the service Contract Execution; and 6.23% (619a) for the service Clearing unresolved issues.

In FIG. 6A, Output Calculation (620a) comes from Output Calculations (530a) in FIG. 5A. It does not necessarily have to come from (530a), and can be generated by other means. The data from Default Parameters (610a) and Output Calculations (620a) are sent to Individual Service Pricing Module (600a). The Individual Service Pricing Module (600a) applies the default parameters to the data in Output Calculations (620a), thus generating the results for the specific house data in output calculations. The Output Calculations (620a) include Service Provider House Price (621a), Total Cost of All Services (622a) and Service Provider Fee Input (623a). The parameters in Default Parameters (610a) are List of Agent Services (611a), Service Groups (612a), Service Package Composition (613a) and Multiple Services Discount Factor (615) setup in this embodiment to a value of 1 for simplicity. In effect the default parameters are applied to the house in the first shopping cart (420) of the linked shopping carts shown in FIG. 4.

The Individual Service Pricing Module (600a) defines Individual Service Pricing (630a), including Ala Carte Pricing (631a), Package Pricing (632a) and Service Provider Fee (633a). The Individual Service Pricing (630a) does the following operations: Setting the price of Tours to $150; setting the price of Price Analysis to $300, and setting the price of Disclosures to $100. The price of Contract Preparation is calculated as 12.46*Full Service Price/100, which is 12.46*$20,000/100 equaling $2,491.12. The price of Contract Negotiations is calculated as 34.25*Full Service Price/100, which is 34.25*$20,000/100 equaling $6,849.32. The price of Contract Execution is calculated as 43.38*Price of Full Service/100, which is 43.38*$20,000/100 equaling $8,716.39. The price of Clearing unresolved issues is calculated as 6.23*Total Cost of All Services/100, which is 6.23*$20,000/100 equaling $1,245.56. The total Cost of all the services is $150+$300+$100+$2,491+$6,849+$8,716+$1,246=$19,852. The Total Cost of All Services of $20,000 is the maximum full service cost, and it is greater than $19,852, which is the total cost of all the services. As illustrated, Default Parameters (610a) sets up the rules for subdivision of the services and the rules for the pricing of each of the services. The Individual Service Pricing Module (600a) applies the rules to the data of a specific house.

The user may pick a house and put it in Shopping Cart 1 (215), that is, the first shopping cart of the linked shopping carts from FIG. 4. Then the user can pick specific services he/she needs for the purchase of that house and put them in Shopping Cart 2 (220), that is, the second shopping cart of the linked shopping carts from FIG. 4.

Figure 6B:
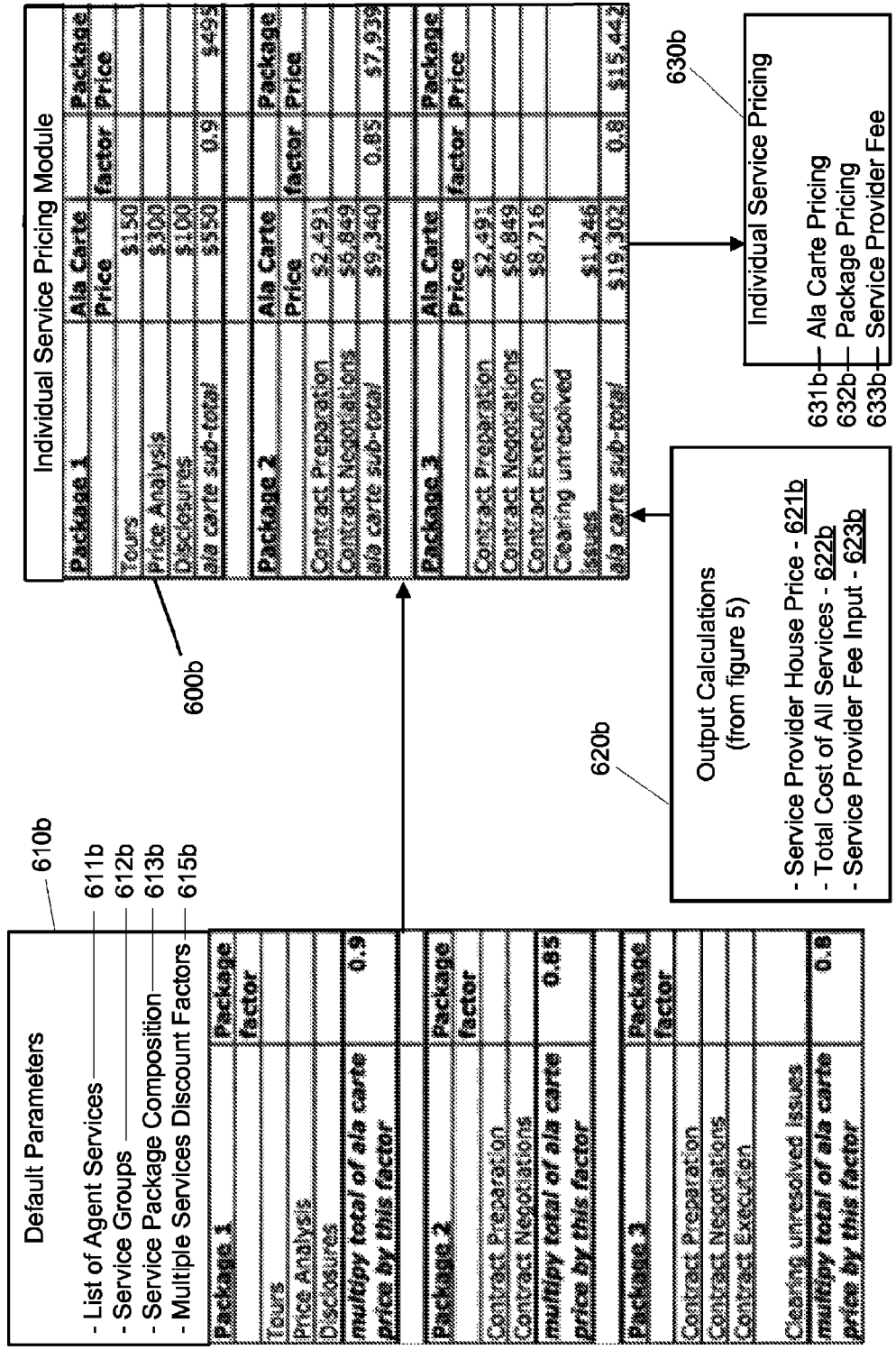

FIG. 6B continues with the illustration in FIG. 6A and further illustrates Service Package Composition (613b). Services that are grouped together are called a package. The client may then purchase the entire package and receive all the services in the package. Typically, the cost of buying a package would be lower than purchasing the services individually. Purchasing services individually is also referred to herein as ala carte purchasing. Service Package Composition (613b) includes the packages along with the contents of the package and the rules for the pricing of each package. In the FIG. 6B illustration, three packages are created, called Package 1, Package 2 and Package 3.

Package 1 contains the services: Tours, Price Analysis and Disclosures. Package 2 contains the services: Contract Preparation and Contract Negotiations. Package 3 contains the services: Contract Preparation, Contract Negotiations, Contract Execution and Clearing unresolved issues.

A package factor is set for each of the packages. The price of each package is determined by multiplying the sum of price of the services in the package by the package factor. In this illustration, the package factor is set as 0.9 for Package 1, 0.85 for Package 2 and 0.8 for Package 3.

The parameters in Service Package Composition (613b) are sent to Individual Service Pricing Module (600b). The Individual Service Pricing Module (600b), using Package Pricing (632b), sends the price of the items and packages selected to the Individual Service Pricing (630b) using the Service Provider Fee (633b). The Individual Service Pricing Module (600b) applies the Default Parameters (610b) to the data of a specific house coming from Output Calculations (620b). The Output Calculations (620b) include Service Provider House Price (621b), Total Cost of All Services (622b) and Service Provider Fee Input (623b). Thus, the price of each package is calculated in the Individual Service Pricing Module (600b). The price of Package 1 is calculated using Ala Carte Pricing (631b) yielding a subtotal of prices of the List of Agent Services (611b) in Package 1*package factor which is $550*0.9 equaling $495. In a similar manner pricing for Package 2, is calculated to be $7,939 and the price for Package 3 is calculated to be $15,442.

Figure 6C:
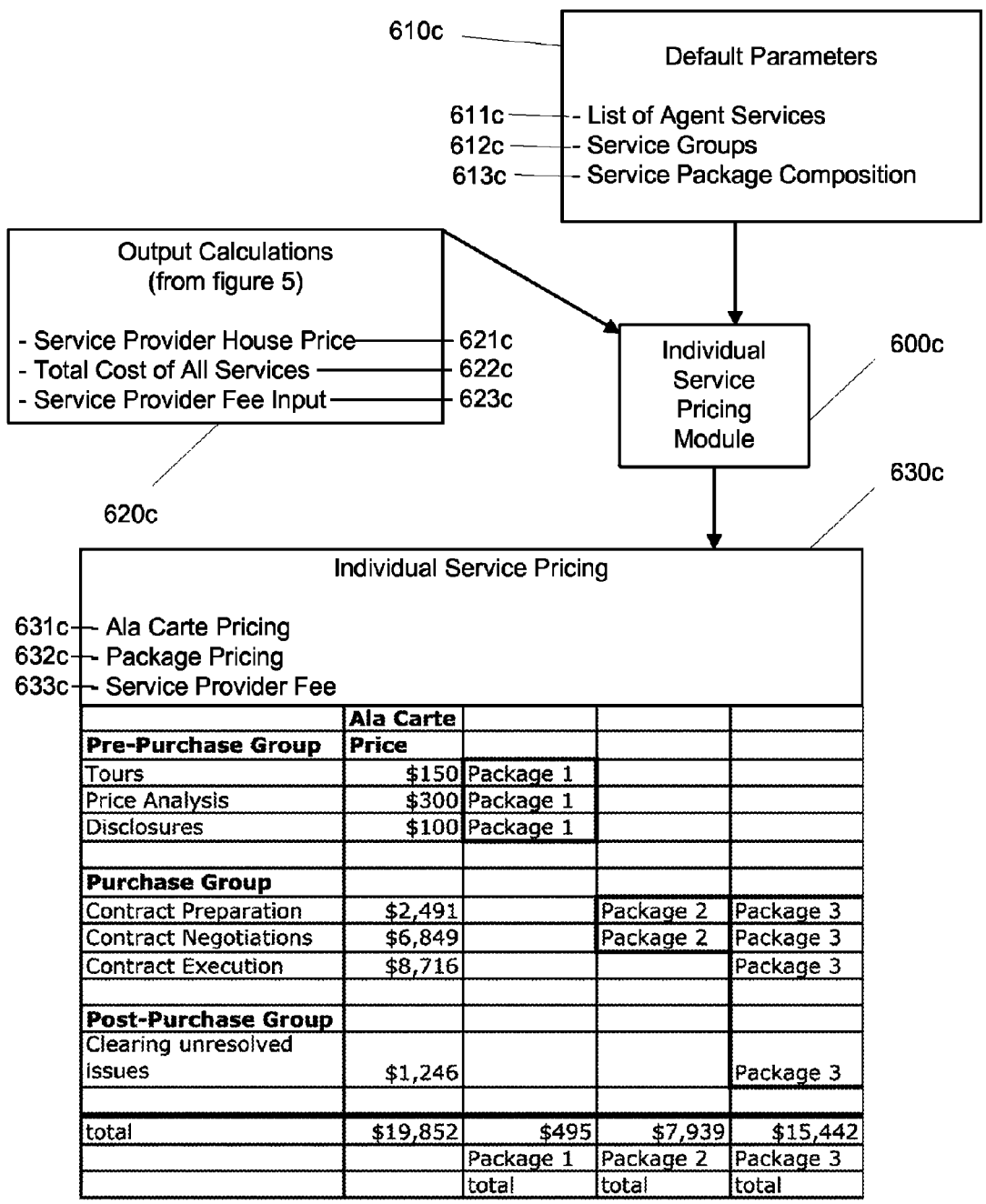

FIG. 6C continues the example of FIG. 6B and further illustrates Individual Service Pricing (630c) from the Individual Service Pricing Module (600c) using Ala Carte Pricing (631c) using Package Pricing (632c) and Service Provider Fee (633c). In Individual Service Pricing (630c), the effect of applying the parameters from Default Parameters (610c) are displayed to the user. The parameters in Default Parameters (610c) are List of Agent Services (611c), Service Groups (612c), Service Package Composition (613c). Preferably, the display is structured with radio buttons and check boxes in such a way that the user can select services or a package of services and put them into the Shopping Cart 2 (220) of the linked shopping carts shown in FIG. 4. The Output Calculations (620c) include Service Provider House Price (621c), Total Cost of All Services (622c) and Service Provider Fee Input (623c).

FIG. 7 illustrates a module within Other Modules (112) in FIG. 1. Specifically, FIG. 7 illustrates the Loan Savings Calculator Module (700).

In this module, a Client (150) makes inputs into the Loan Parameters (720). These inputs include: Loan Interest, Amortization, Selection of Services and Type of Payment. The input values are sent to Loan Savings Calculator Module (700). The data from Individual Service Pricing (630) is sent to Loan Savings Calculation Module (700). Specifically Individual Service Pricing (630) sends Service Providers House Price (621) and the Total Cost of All Services (622) to the Loan Savings Calculator (700). The fee for the service can be paid up front, before the house purchase transaction is completed. Paying up front or earlier than closing is as also referred to as Pay As You Go (750). Payment may also be deferred to closing and included as part of the loan financing the purchase. The latter form of payment is referred also as Pay Fees As Commissions, which is the traditional way clients pay for real estate services used in real estate transactions. The key difference here is that the method described herein allows fees for unbundled real services, rather than a fixed commission, to be added to house price and to be paid as commissions at the closing of such purchase transaction. Today, only commissions for full service provided by real estate agents are added to house prices and paid at the closing of a purchase transaction.

The Loan Savings Calculator Module (700) calculates the short-term and long-term savings for both these payment options. These results are sent to the Payment Options (740). At this point, the Client (150) may choose Pay As You Go (750), which will pay the fees for the partial transactions up front. Alternatively, the Client (150) may choose to pay the Pay Fee As Commission (760), which means the Client (150) will pay a fee for the partial transactions as part of the loan. Depending on the choice made by the Client (150), the financial implications such as immediate price savings, long-term savings and monthly payments are preferably displayed to the client.

A Client (150) may re-enter Payment Options (740) or re-enter Loan Parameters (720) to repeat calculations. Additionally, a Client (150) may choose different payment methods for different services selected and have portions of the services paid using upfront payment and portion of fees included in the loan.

Figure 7A:
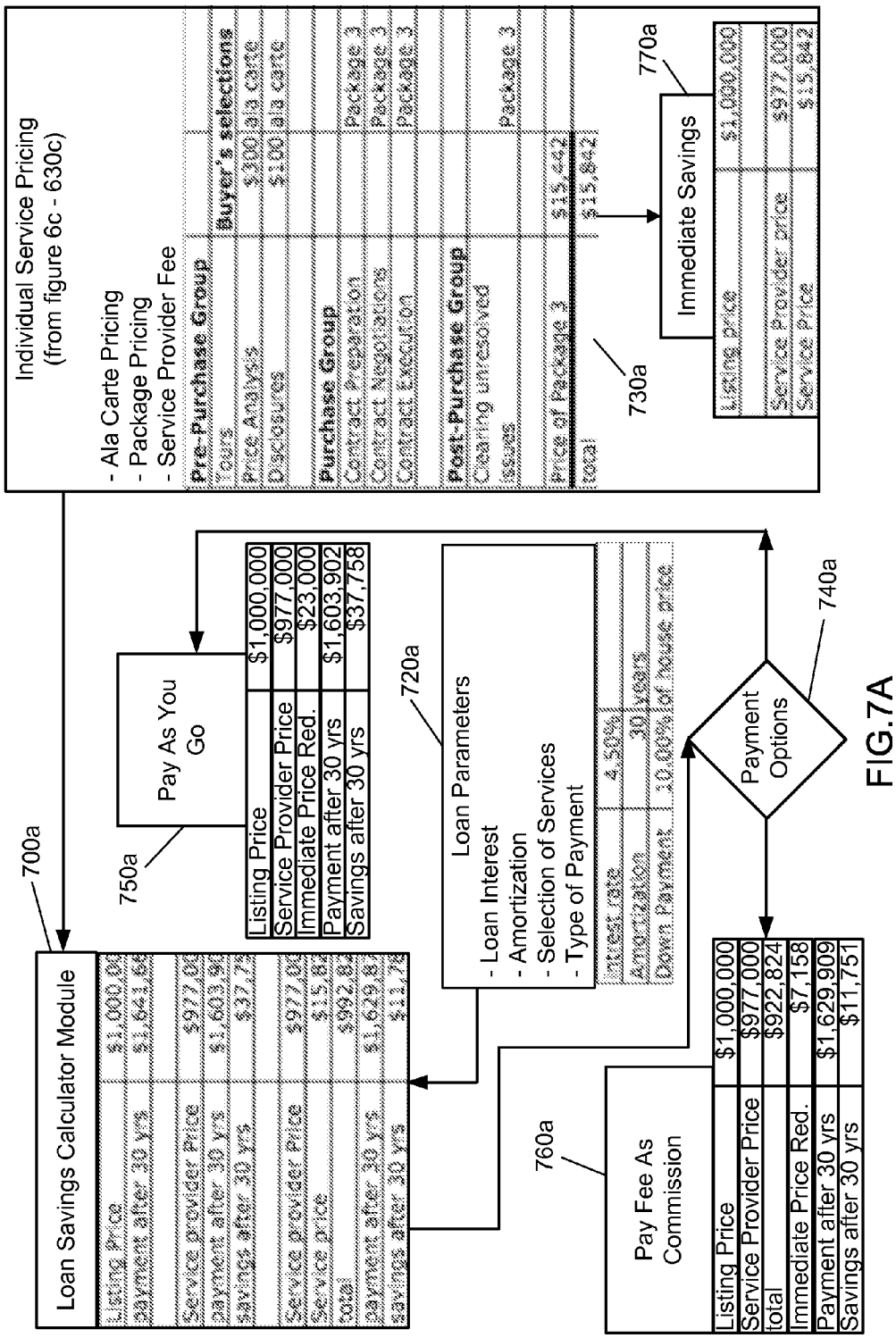
FIG. 7A is illustration of a specific embodiment of the mechanism shown in FIG. 7.

FIG. 7A uses the example given in FIG. 6C to illustrate FIG. 7. In FIG. 6C, the Individual Service Pricing (630*c*) presents the user with a choice of services that he can select. In FIG. 7A, the Individual Service Pricing (730*a*) illustrates the choices that the user has made. These are the selections that are put into the Shopping Cart 2 (220) in FIG. 4. The Individual Service Pricing (730*a*) shows a total of $15,842 for the services the user has selected. If the user had tried to directly purchase the house, he would potentially pay the listing price of $1,000,000. Immediate Price Red. (770*a*) (Red. is an abbreviation for Reduction) shows the immediate savings the user would make by making the purchase through the service provider. If the user chooses the Pay As You Go Payment Method, his immediate price reduction is determined by the calculation Listing Price–Service Provider Price, which is $1,000,000−$977,000 equaling $23,000 as the immediate price reduction. If the user chooses Pay Fees as Commissions, the immediate price reduction is determined by the calculation: Listing price−(Service Provider Price+Service Price), which is $1,000,000−($977,000+15,842), which equals $7,158 in immediate savings.

The user enters individual loan details into the Loan Parameters (720*a*). In this illustration, the interest rate is 4.5%, The Amortization period is 30 years and the down payment is 10% of the house price. Data from Loan Parameters (720*a*) and data from Individual Service Pricing (730*a*) are sent to the Loan Savings Calculator Module (700*a*). The calculator shows that if the buyer paid the listing price of $1,000,000, at the end of 30 years, he would have paid $1,641,660.

At this point, the buyer can pay the Service price of $15,842 up front or he/she can pay it as part of the loan. If he/she pays the Service price upfront, it is called Pay as You Go. If he/she pays it as part of the loan, it is considered an agent commission and this method is called Pay Fees as Commission. If the buyer takes the Pay as You Go route, the loan amount is the Service provider price of $977,000 and he will pay $1,603,902 at the end of 30 years, thus saving $37,758 compared to paying the listing price through a 30 years loan. If he takes the Pay Fee As Commission (760*a*) route, his loan amount is ($977,000+$15,842) which is $992,824 and he will pay $1,629,879 at the end of 30 years, thus saving $11,781 compared to paying the listing price through a 30 year loan.

In Payment Options (740*a*), the user allowed to make a choice between Pay as You Go (750*a*) and Pay Fees As Commission (760*a*). The financial implications of both the choices are shown and he can come back to Payment Options (740*a*) and change his choice.

FIG. 8 shows the functioning of Search Module (108) of FIG. 1. When the user executes a search, some of the search results come from publicly available web sites, and some of the other results are generated based on data that is not publicly available. FIG. 8 shows how the search module generates the search results.

There are three servers that interact when the Search Module (108) functions. These are the Service Provider Server (800), the Agent Web Site Server (870) and the MLS Server (880). The Agent Web Site Server (870) will display publicly available information of a house. The MLS Server (880) will provide access to information about the house that is available only to the Broker and not typically available to the public. The Service Provider Server (800) will coordinate the access to the Agent Web Site Server (870) and the MLS server (880) and will generate subsequent results. Although in this embodiment, there are three servers, these three servers may be located on a single server or any other combination of servers.

The MLS Search Parameters (810) are input by the user and sent to the Service Provider Server (800). The Service Provider Server (800) takes action that sends the search parameters to agent's server (830), a destination shown as the Agent's Web Site Server (870). The Agent's Web Site Server (870) is expected to find multiple houses that will match the search parameters and return the search results to the Service Provider Server (800). Here the MLS numbers (a unique number for each house) of the houses in the search results will be collected and sent to: Search results from Agent Server, send MLS number to Broker's Server (840). The Broker's server is the MLS Server (880). Using the MLS number, the MLS Server (880) generates data that is not publicly available and sends the data to the Service Provider Server (800), indicated on FIG. 8 as: Search results from Broker's server (850).

The Service Provider Server (800) performs a calculation based on data from the MLS Server and the Agent Web Site Server (870). This is shown as: Calculations with data from search results from: 1. MLS Server, 2. Agent's Web Site (860). These results along with the publicly available results are displayed to the user in MLS Search Results (820).

Figure 8A:
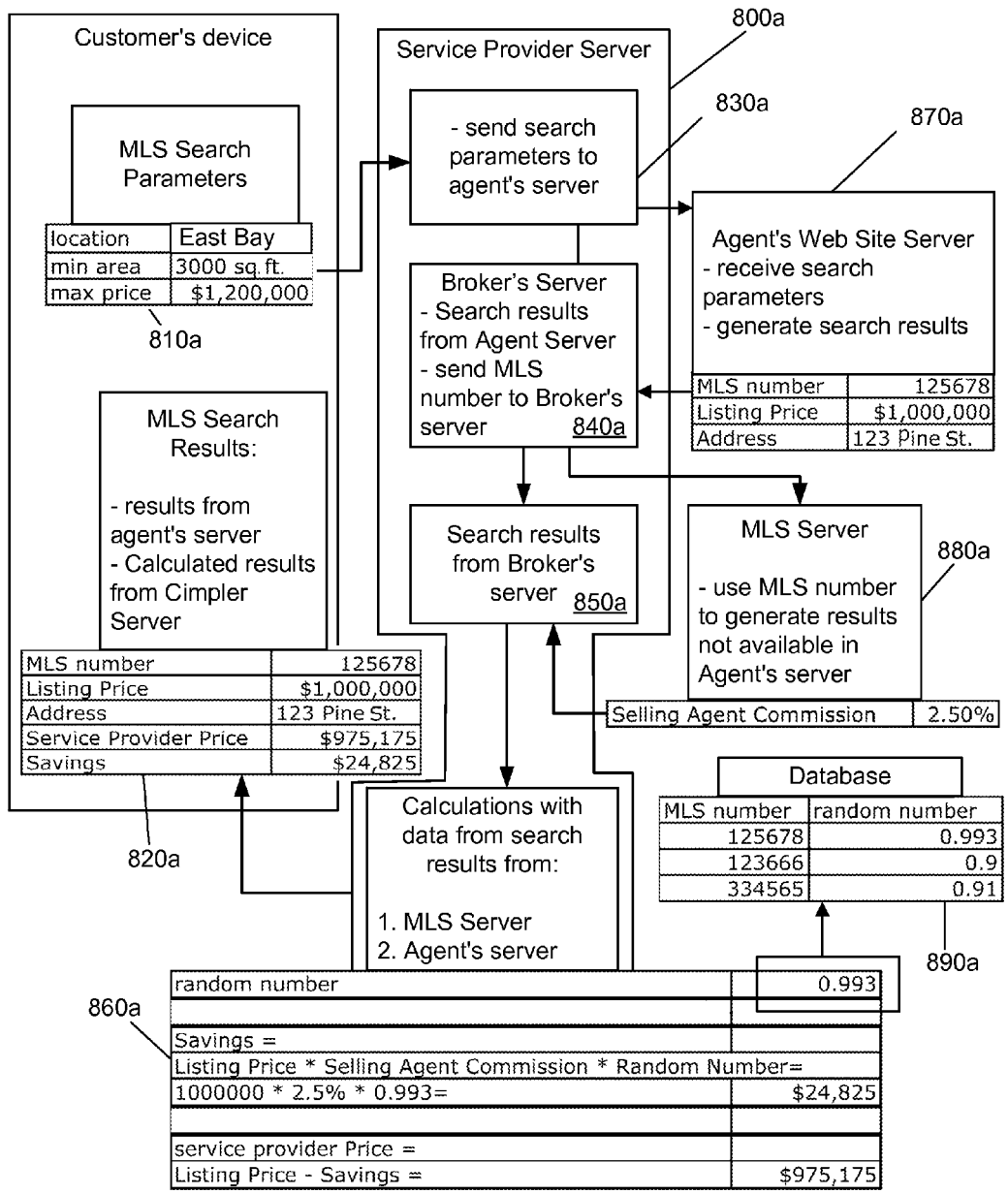
FIG. 8A is an illustration of a specific embodiment of the mechanism shown in FIG. 8

FIG. 8A further illustrates the specific embodiment of the Search Module (108) shown in FIG. 8. In the MLS Search Parameters (810*a*), the user searches for a house in the East Bay location, larger than 3,000 sq. ft and below a price of $1,200,000. These parameters are sent to the Service Provider Server (800*a*). The Service Provider Server (800*a*) then implements a step to send search parameters to agent's server (830*a*), which forwards the parameters to the Agents Web Site Server (870*a*). The Agents Web Site Server (870*a*) preferably finds all the houses that match these parameters and results are sent to Broker's Server (840*a*) in the Service Provider Server (800*a*).

One of the houses in the search results, has an MLS number of 125678 and a listing price of $1,000,000. This MLS number is sent to the MLS Server (880*a*) by the Broker's Server (840*a*). The MLS Server (880*a*) determines that the selling agent commission for this house is 2.50%. Typically, this information is not publicly available and the server provider is preferably contractually obliged to keep it secret. The Search results from Broker's server (850*a*) in the Service Provider Server (800*a*) receives this information from the MLS Server (880a) and sends it a module to perform: Calculations with data from search results from: 1. MLS Server, 2. Agent's server (860a).

The module to perform: Calculations with data from search results from: 1. MLS Server, 2. Agent's server (860a) generates a random number specific to this MLS number and stores it in a Database (890a). In this case the Random Number is 0.993. Preferably, this random number is generated only once for each MLS number, and it is henceforth retrieved from the Database (890a).

The Savings that will be available to the user are calculated by Listing Price* Selling Agent Commission*Random Number which is $1,000,000*2.5*0.993 giving $24,824. The role of the random number here is to hide the true value of the Selling Agent commission from the user and the public and thus meet the contractual obligations of Server Provider to not reveal the Selling Agent Commission. Based on the Savings of $24,825, the Service Provider price is Listing Price−Savings which is $1,000,000−$24,825 giving a Service Provider Price of $975,175. Now the following values are displayed to the user in MLS Search Results (820a). These results are MLS number of 125678, a Listing Price of $1,000,000, the address, the Service Provider Price of $975,175 and a Savings of $24,825.

Figure 9:
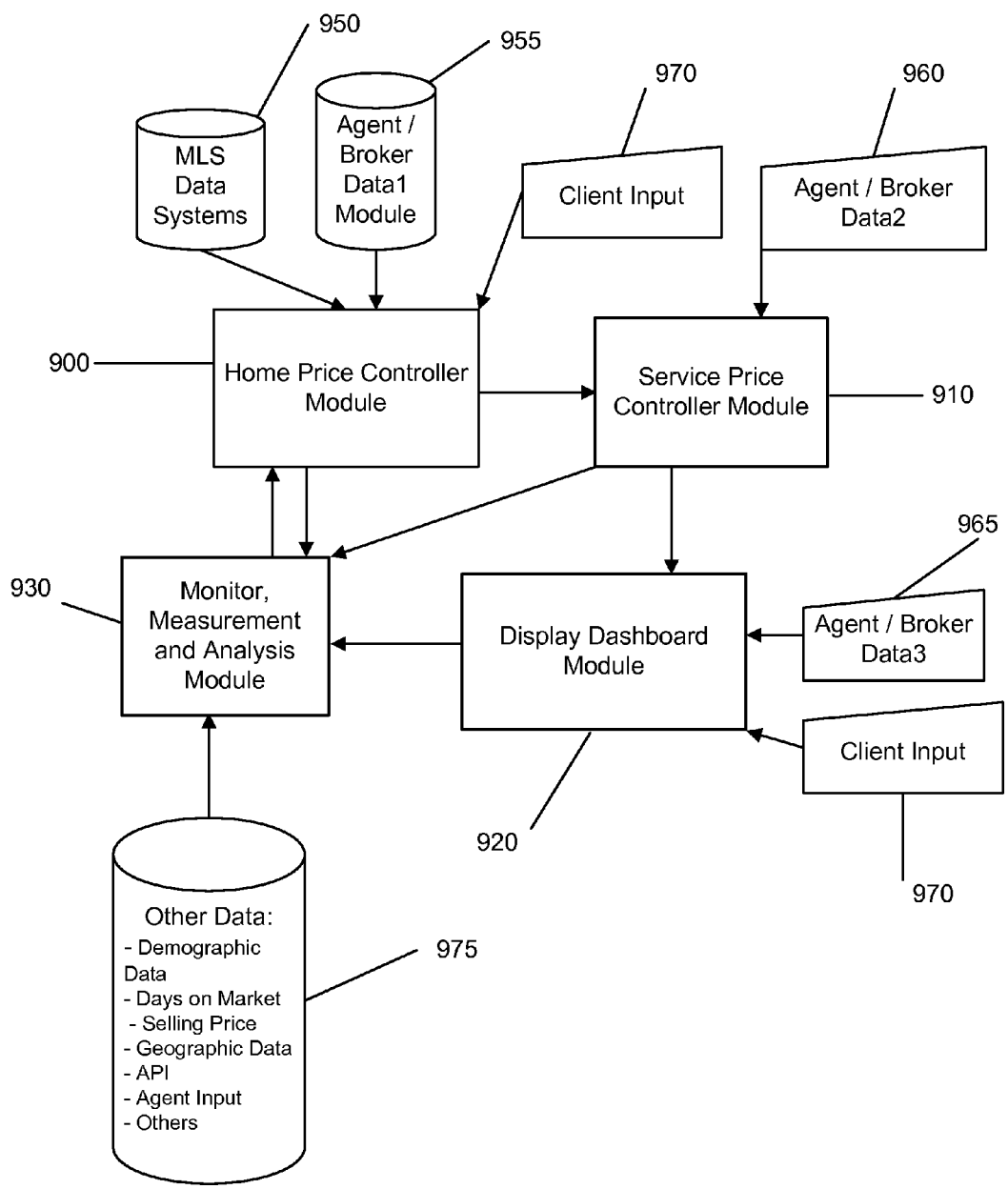
FIG. 9 is an exemplary illustration of a specific embodiment of the system.

FIG. 9 illustrates a preferred embodiment of a system for automatic pricing and of homes and home selling services. This system includes a Home Price Controller Module (900), Service Price Controller Module (910), Display Dashboard Module (920), Monitor Measurement and Analysis Module (930).

The Home Price Controller (900) automatically reexamines prices for all homes in the attached MLS Data Systems (950) based on data retrieved from the Agent Broker Data1 Module (955) and data received from the Monitor, Measurement and Analysis Module (930).

In one of its embodiments, the Home Price Controller (900) may include the Real Estate Rule-Set Module (102) of FIG. 1 that holds rule-sets used for real estate knowledge quantification, and a Search Module (108) of FIG. 1 that facilitates search for real estate properties according to the search criteria determined by Client Input (970).

The Service Price Controller Module (910) automatically determines prices of real estate services and packages as to be provided by service providers, Agent/Broker Data2 (960), using property prices and cost of agent services calculated in the Home Price Controller Module (900).

The Service Price Controller Module (910) can include: the Partial Transaction Module (104) of FIG. 1, which enables real estate transactions to be divided into parts (components) according to the Real Estate Rule-Set Module of FIG. 1; the Shopping Cart Module (105) of FIG. 1 that has linked shopping carts to enable clients to select various properties together with client selected agent services needed to purchase these properties and agents to perform selected services.

The Display Dashboard Module (920) calculates and displays property price, agent service prices and savings calculated following Client Input (970). The Display Dashboard Module (920) can contain a Sandbox Module (106) in FIG. 1 that allows clients to obtain estimates of property prices and estimates of prices for transaction services to be provided by agents, Data from Agent/Broker Data3 (965), also referred to as agent services), and estimates of savings for clients and Loan Calculation module, which is also presented in FIG. 7 and a Checkout Module (110) in FIG. 1 that facilitates payments for selected agent services.

The Monitor, Measurement and Analysis Module (930) receives Other Data (975) to enable monitoring, measuring and analyzing of real estate transaction data for purpose of updating service providers prices calculated by the Home Price Controller Module (900).

The illustrated modules can be integrated with one another in various ways, so long as certain functionality is preserved.

Figure 9A:
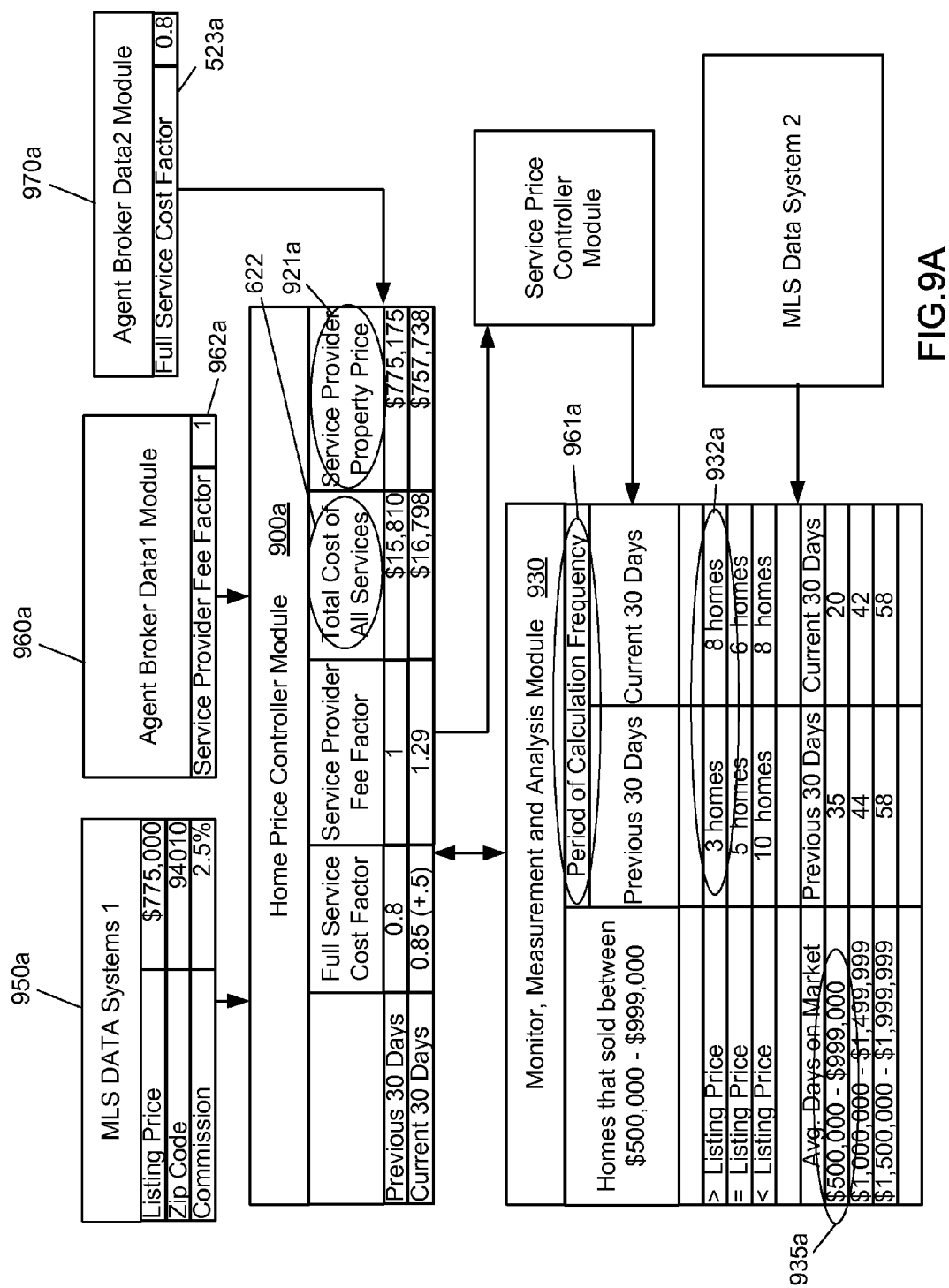
FIG. 9A illustrates automatic system adaptation to changing market conditions by adjustments to Service Provider Property Prices and Service Provider Fees.

FIG. 9A in combination with FIG. 5 and FIG. 5a illustrate a specific embodiment of the mechanism shown in FIG. 9 and shows how the system (100) in FIG. 1 adapts to changing market conditions by automatically adjusting Service Provider Property Price (921a) and the Service Provider Fee (533). The key controlled variables in this embodiment are Full Service Cost Factor (523a) and Service Provider Fee factor (962a), which is a service provider fee factor. Full Service Cost Factor (523a) is a variable in calculations of Total Cost of All Services (622) and the Service Provider Fee factor (962a) is a variable in calculation of Service Providers Property Price (921a).

Home Price Controller Module (900a) preferably holds a copy of all listing prices and selling agent commissions received from the interconnected MLS Data Systems 1 (950a). For simplicity, the operation of the system is explained in reference to FIG. 9a using a price range from $500,000 to $999,999. A house has a Listing Price of $775,000 in the zip code 94010. The selling agent commission is set in this example to 2.5%. The corresponding Service Provider Property Price (921a) is shown in the Home Price Controller Module (900a) equaling $757,175. The Service Provider Fee (533) that alters each listing price is fetched from the MLS Data Systems 1 (950a) and may also be calculated in the Home Price Controller Module (900a).

The Home Price Controller Module (900a) holds data received from the Agent/Broker Data1 module (960a), such as a Period of Calculation Frequency (961a). The Period of Calculation Frequency (961a) determines how often calculations to adjust/modify data controlled by the Home Price Controller module (900a) is to be performed. For example, the Period of Calculation Frequency (961a) may be set to 24 hours and the observation period may be set to 30 days.

Service Price Controller Module (900a) holds parameters received from the Agent/Broker Data2 Module (970a), which in this example are the same two parameters as those in Default Parameters Module (520) presented in FIG. 5 and FIG. 5A, namely Service Provider Fee factor (962a) set to 1, Full Service Cost Factor (523A) set to 0.8 and a Service Provider Fee (533), not shown in FIG. 9a.

The Service Provider Fee (533) for the Listing Prices stored in the Home Price Controller Module (900a) are calculated and stored in the Service Price Controller Module (910a) using method illustrated in FIG. 5 and FIG. 5A.

In this embodiment, the Monitor, Measurement and Analysis Module (930) receives the value of the days on market parameter for all properties sold in the zip code 94010 and calculates the number of homes selling above, at or below the List Price and the average number of days on the market. The Monitor, Measurement and Analysis Module (930) collects and stores actual Selling Prices for all properties sold in the zip code 94010 to compare them against the Listing Price of any particular home in question.

For example, the Monitor, Measurement and Analysis Module (930) table in FIG. 9a has data for the current 30-day prior period and a previous 30-day period. These are organized for the different price ranges shown. For example, for homes that sold between $500,000-$999,000 at a listing price greater than the Listing Price of the property in question, the number of homes sold increased over the two 30-day periods from 3 homes to 8 homes (932*a*). Values are also shown for homes having the same Listing Price and a lower Listing Price.

For houses with a listing price in a range of $500,000 to $999,000 (935*a*), during the previous 30-day period, they stayed on the market for an average of 35 days and for the current 30-day period, they stayed for an average of 20 days.

The values of calculated days on market are transferred to Home Price Controller Module (900*a*). Through look up tables in the Home Price Controller Module new values of these parameters changed the value of the Full Service Cost Factor (523A) from 0.8 to 0.85 and the Service Provider Fee Factor (962*a*) from 1 to 1.29. All Service Providers property prices are recalculated to the new values. These changes equate to a new Service Provider Property Price (921*a*), which increased from $757,175 to $757,738.

The new value of Full Service Cost Factor (523A) of 0.85 is transferred from the Home Price Controller Module (900*a*) to the Service Price Controller Module (910*a*). The Total Cost of All Services (622) is increased from $15,810 to $16,718 and this value is also transferred to the Service Price Controller Module (910*a*). As prices of partial broker services are calculated based on the value of the Total Cost of All Services (622) all corresponding values of individual services increase as well.

Thus, the system (100) is automatically learning by updating the look up tables in the Home Price Controller Module (900*a*). The data for the look up tables is collected by brokers during the system (100) operations.

Figure 11:
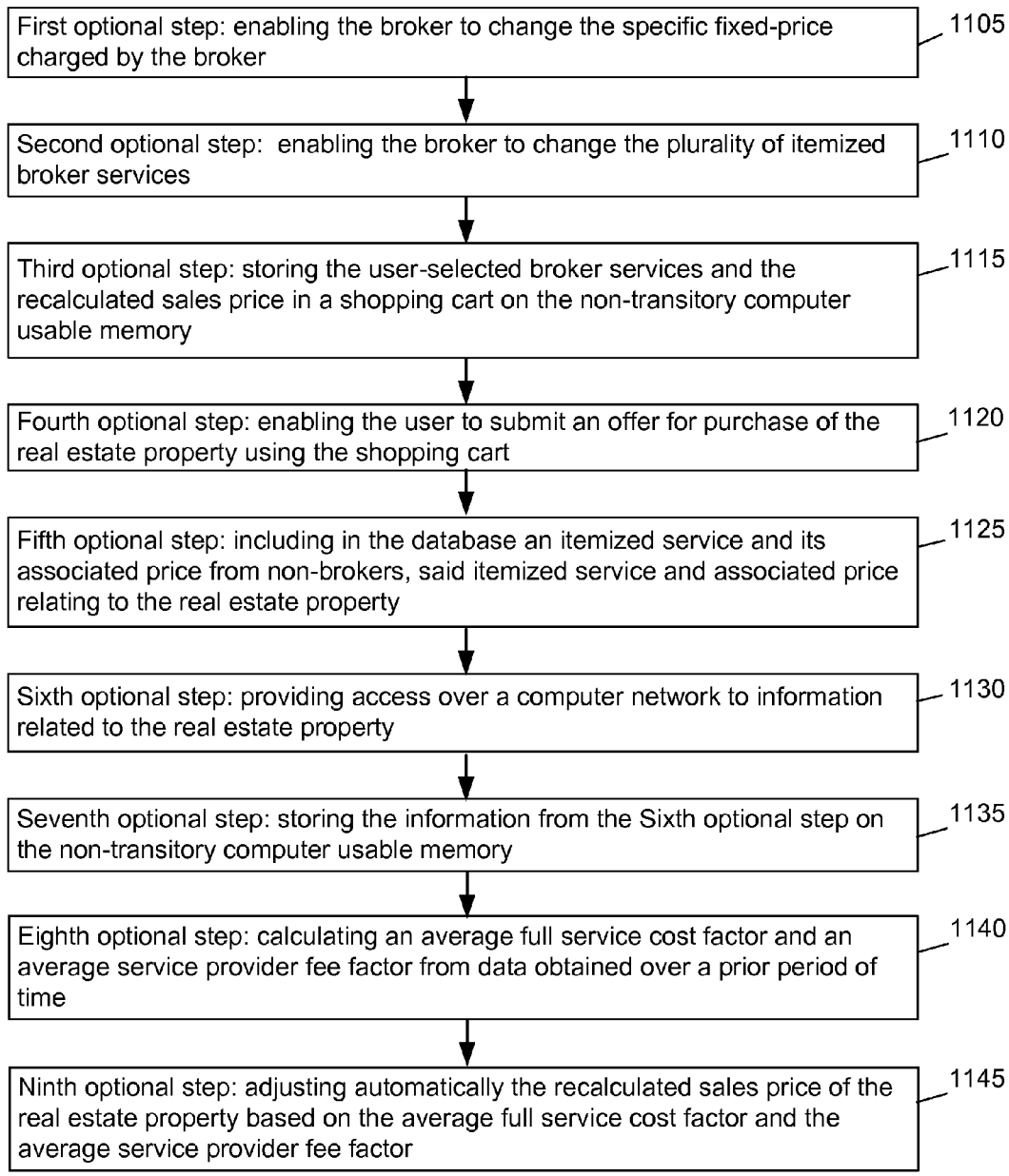
FIG. 11 is a diagram of optional method steps added to those of FIG. 10.

The automated learning steps are optional and are illustrated in FIG. 11. These steps include Eight optional step (1140): calculating an average full service cost factor and an average service provider fee factor from data obtained over a prior period of time, and Ninth optional step (1145): adjusting automatically the recalculated sales price of the real estate property based on the average full service cost factor and the average service provider fee factor.

Figure 10:
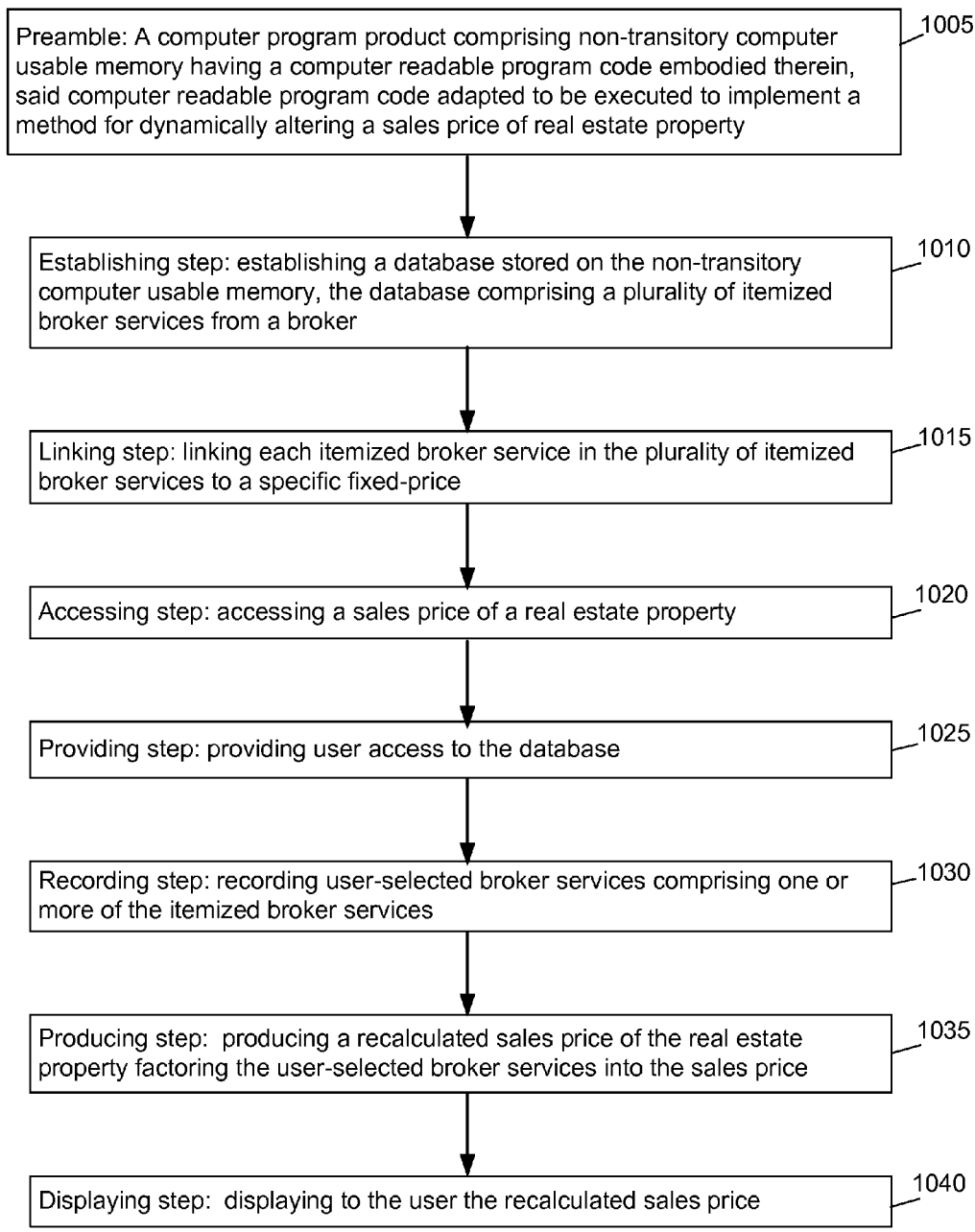
FIG. 10 is a diagram of preferred method steps performed by a computer program product.

The system (100) may be described as a computer program product implementing steps, as shown in FIG. 10. A Preamble (1005) describes this as a computer program product comprising non-transitory computer usable memory having a computer readable program code embodied therein, said computer readable program code adapted to be executed to implement a method for dynamically altering a sales price of real estate property.

A computer program product is intended to include implementation in one or more computer programs that are executable on a programmable system including at least one programmable processor coupled to receive data and instructions from, and to transmit data and instructions to, a data storage system, which is referred to as non-transitory computer memory, at least one input device, and at least one output device. Each computer program can be implemented in a high-level procedural or object-oriented programming language or in assembly or machine language if desired; and in any case, the language can be a compiled or interpreted language.

Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile, non-transitory memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in application specific integrated circuits (ASICs).

To provide for interaction with a user, embodiments of the invention can be implemented on a computer system having a display device, such as a monitor or LCD screen, for displaying information to the user and a keyboard and a pointing device, such as a mouse or a trackball by which the user can provide input to the computer system. The computer system can be programmed to provide a graphical user interface through which computer programs interact with users.

An Establishing step (1010) includes establishing a database stored on the non-transitory computer usable memory, the database comprising a plurality of itemized broker services from a broker. A database is information stored in the non-transitory memory and accessible for the computer operations implemented by the computer program product. The database optionally includes one or more itemized service from non-brokers, such as engineering inspection services. Such service from non-brokers is preferably one relating to the real estate property and also preferably offering some convenience or value to the buyer.

A Linking step (1015) includes linking each itemized broker service in the plurality of itemized broker services to a specific fixed-price. By linking, it is simply meant that each itemized broker service has a price associated with it, which can then be used in computer operations implemented by the computer program product. If the database includes an itemized service from non-brokers, then such itemized service is also linked with its associated price. The Linking step (1015) may be supplemented by the optional step of enabling the broker to change the specific fixed-price charged by the broker.

An Accessing step (1020) includes accessing a sales price of a real estate property. In order to calculate savings due to the selection of parceled broker services, list price or sales price of the real estate property is accessed in computer operations implemented by the computer program product. Optionally, such accessing step is enabled by providing access over a computer network to information related to the real estate property, such as accessing an MLS service and then storing that information on the non-transitory computer usable memory.

A Providing step (1025) includes providing user access to the database. In order for a user to select parceled real estate services, the user must be able to access the database so that the user may review and then select individually priced services.

A Recording step (1030) includes recording user-selected broker services comprising one or more of the itemized broker services. In this step the computer program product causes the computer to record or store the user's selections of desired broker services in the list of itemized broker services. Optionally, one or more computer shopping carts in the non-transitory computer usable memory may be used to store the user-selected broker services and the recalculated sales price. Several such shopping carts may be used to organize the selections for multiple real estate properties and then implement a step of enabling the user to submit an offer for purchase of the real estate property using the shopping cart.

A Producing step (1035) includes producing a recalculated sales price of the real estate property factoring the user-selected broker services into the sales price. More than one broker may be involved, each potentially providing a different service. The user selected services may be less than the entire package of broker services and this will produce a recalculated price that is less than the sales price. When additional broker services beyond the traditional full scope service package are selected, or when more than one broker is providing the same service, the recalculated price may be more than the sales price.

A displaying step (1040) includes displaying to the user the recalculated sales price. The computer performs a complicated calculation based on selected broker services and then shows the user the recalculated sales price.

The method may be supplemented by a First optional step (1105) shown in FIG. 11, which includes enabling the broker to change the specific fixed-price charged by that broker. Each broker is ultimately responsible for the prices being charged for his services. For example, should he decide to lower the price for those services, the broker might expect more business.

The method may be supplemented by a Second optional step (1110) shown in FIG. 11, which includes enabling the broker to change the plurality of itemized broker services. This includes a capability to change one or more of the itemized broker services, for example by supplementing the description of one or more itemized broker services or indicating additional limitations on what will be performed when that broker is rendering the service.

The method may be supplemented by a Third optional step (1115) shown in FIG. 11, which includes storing the user-selected broker services and the recalculated sales price in a shopping cart on the non-transitory computer usable memory. A shopping cart system enables the buyer to organize and present for purchase the property and individual services selected when purchasing real estate property.

The method may be supplemented by a Fourth optional step (1120) shown in FIG. 11, which includes enabling the user to submit an offer for purchase of the real estate property using the shopping cart. Once organized in the shopping cart, the user can place an order or make an offer for the property with the selected broker services.

The method may be supplemented by a Fifth optional step (1125) shown in FIG. 11, which is including in the database an itemized service and its associated price from non-brokers, said itemized service and associated price relating to the real estate property. These would typically be supplementary services, such as engineering home inspection services, termite inspection, environmental hazards examination, building repair services and any other property-related services which a buyer require in consummating a purchase of real estate.

The method may be supplemented by a Sixth optional step (1130) shown in FIG. 11, which includes providing access over a computer network to information related to the real estate property. The method may be conducted by a single computer with internal access to the requisite databases. However, it is also probable that such databases are accessed by the computer running the program over a network, such as the Internet.

The method may be supplemented by a Seventh optional step (1135) shown in FIG. 11, which includes storing the information from the Sixth optional step (1130) on the non-transitory computer usable memory.

Figure 12:
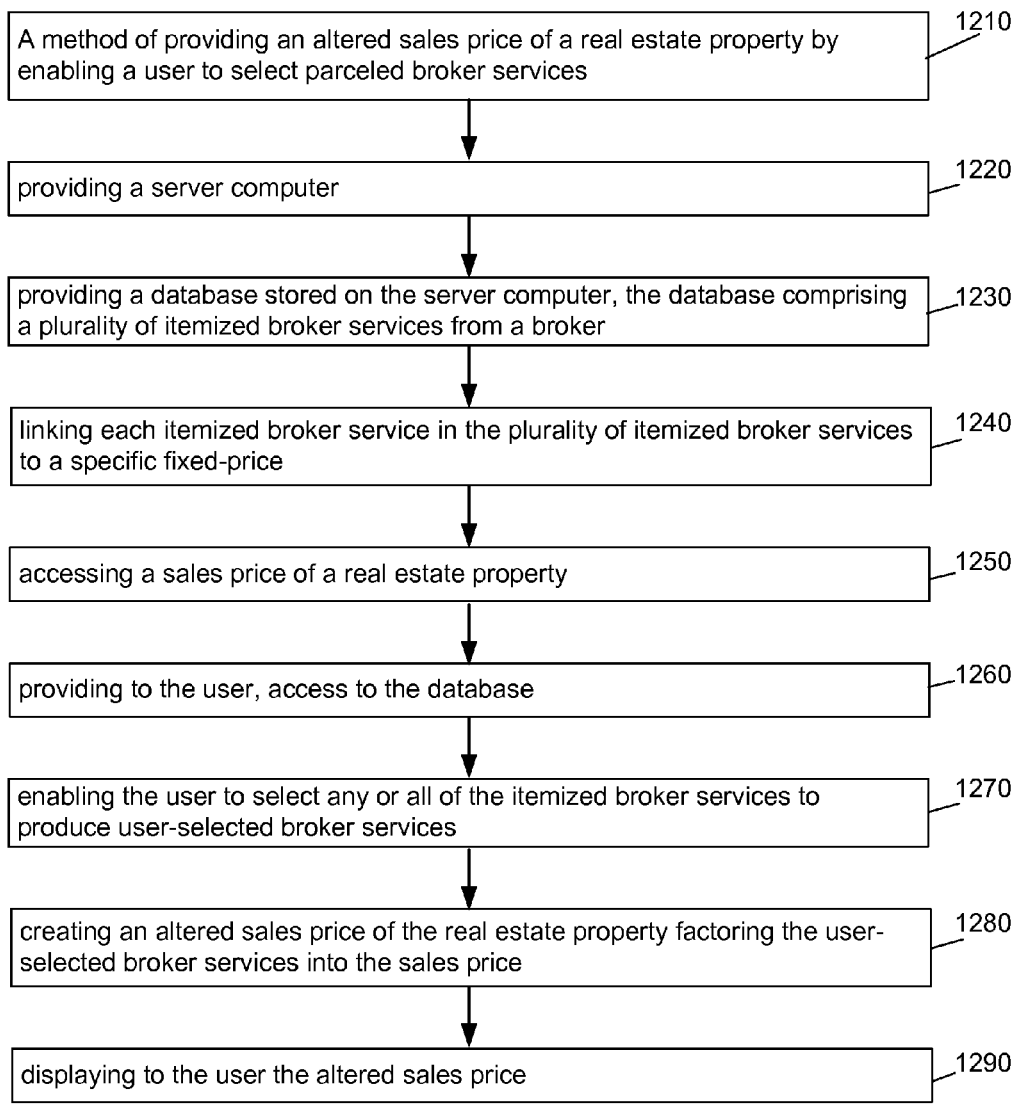
FIG. 12 is a diagram of a preferred method for implementing the system disclosed.

FIG. 12 describes a method according to the invention in an alternative fashion as a method of providing an altered sales price of a real estate property by enabling a user to select parceled broker services (1210). The method includes steps of providing a server computer (1220); providing a database stored on the server computer, the database comprising a plurality of itemized broker services from a broker (1230); linking each itemized broker service in the plurality of itemized broker services to a specific fixed-price (1240); accessing a sales price of a real estate property (1250); providing to the user, access to the database (1260); enabling the user to select any or all of the itemized broker services to produce user-selected broker services (1270); creating an altered sales price of the real estate property factoring the user-selected broker services into the sales price (1280); and displaying to the user the altered sales price (1290).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the real estate industry.

What is claimed is:

1. A computer program product comprising non-transitory computer usable memory having a computer readable program code embodied therein, said computer readable program code when executed by a computer processor causes the computer processor to perform a method for dynamically altering a sales price of real estate property, the method comprising the steps of:
   establishing a database stored on the non-transitory computer usable memory, the database comprising a plurality of itemized broker services from a broker;
   linking each itemized broker service in the plurality of itemized broker services to a specific fixed-price;
   accessing a sales price of a real estate property;
   providing user access to the database;
   recording user-selected broker services comprising one or more of the itemized broker services;
   producing a recalculated sales price of the real estate property factoring the user-selected broker services into the sales price;
   displaying to the user the recalculated sales price;
   enabling the user to select a plurality of real estate properties;
   linking together three shopping carts, the three shopping carts comprising: a first shopping cart holding a house designation for each real estate property in the plurality of real estate properties selected by the user; a second shopping cart holding separate shopping carts for each house designation, each said separate shopping cart holding user-selected broker services; and a third shopping cart holding an identification of a broker selected by the user for each user-selected broker service;
   adding to the first shopping cart each house designation for each real estate property in the plurality of real estate properties selected by the user;
   adding to the second shopping cart each user-selected broker service for each real estate property in the plurality of real estate properties selected by the user, wherein each such user-selected broker service is organized separately for each house designation; and
   adding to the third shopping cart a broker designation for performance of each user-selected broker service, wherein each such broker designation is organized separately for each user-selected broker service.

2. The computer program product of claim 1, wherein the method further comprises the step of enabling the broker to change the specific fixed-price charged by the broker.

3. The computer program product of claim 1, wherein the method further comprises the step of enabling the broker to change the plurality of itemized broker services.

4. The computer program product of claim 1, wherein the method further comprises the steps of:
- storing the user-selected broker services and the recalculated sales price in a shopping cart on the non-transitory computer usable memory; and
- enabling the user to submit an offer for purchase of the real estate property using the shopping cart.

5. The computer program product of claim 1, wherein the method further comprises the step of including in the database an itemized service and its associated price from non-brokers, said itemized service and associated price relating to the real estate property.

6. The computer program product of claim 1, wherein the method further comprises the steps of:
- providing access over a computer network to information related to the real estate property; and
- storing the information on the non-transitory computer usable memory.

7. The computer program product of claim 1, further comprising the steps of:
- calculating an average full service cost factor and an average service provider fee factor from data obtained over a prior period of time, and
- adjusting automatically the recalculated sales price of the real estate property based on the average full service cost factor and the average service provider fee factor.

8. A method of providing an altered sales price of a real estate property by enabling a user to select parceled broker services, the method comprising the steps of:
- providing a server computer;
- providing a database stored on the server computer, the database comprising a plurality of itemized broker services from a broker;
- linking each itemized broker service in the plurality of itemized broker services to a specific fixed-price;
- accessing a sales price of a real estate property;
- providing to the user, access to the database;
- enabling the user to select any or all of the itemized broker services to produce user-selected broker services;
- creating an altered sales price of the real estate property factoring the user-selected broker services into the sales price;
- displaying to the user the altered sales price;
- enabling the user to select a plurality of real estate properties;
- linking together, by a computer processor, three shopping carts, the three shopping carts comprising: a first shopping cart holding a house designation for each real estate property in the plurality of real estate properties selected by the user; a second shopping cart holding separate shopping carts for each house designation, each said separate shopping cart holding user-selected broker services; and a third shopping cart holding an identification of a broker selected by the user for each user-selected broker service;
- adding to the first shopping cart each house designation for each real estate property in the plurality of real estate properties selected by the user;
- adding to the second shopping cart each user-selected broker service for each real estate property in the plurality of real estate properties selected by the user, wherein each such user-selected broker service is organized separately for each house designation; and
- adding to the third shopping cart a broker designation for performance of each user-selected broker service, wherein each such broker designation is organized separately for each user-selected broker service.

\* \* \* \* \*